US006952678B2

(12) United States Patent
Williams et al.

(10) Patent No.: US 6,952,678 B2
(45) Date of Patent: Oct. 4, 2005

(54) METHOD, APPARATUS, AND MANUFACTURE FOR FACILITATING A SELF-ORGANIZING WORKFORCE

(75) Inventors: Daniel F. Williams, Yarrow Point, WA (US); Lawrence L. Ostema, Denver, CO (US); Matthew N. Jensen, Seattle, WA (US)

(73) Assignee: AskMe Corporation, Bellevue, WA (US)

( * ) Notice: Subject to any disclaimer, the term of this patent is extended or adjusted under 35 U.S.C. 154(b) by 859 days.

(21) Appl. No.: 09/944,324

(22) Filed: Aug. 30, 2001

(65) Prior Publication Data

US 2004/0210550 A1 Oct. 21, 2004

Related U.S. Application Data

(60) Provisional application No. 60/229,928, filed on Sep. 1, 2000.

(51) Int. Cl.[7] .............................................. G06F 17/60
(52) U.S. Cl. ....................... 705/1; 705/8; 705/9; 705/12
(58) Field of Search .............................. 705/1, 8, 9, 12

(56) References Cited

U.S. PATENT DOCUMENTS

| | | | | |
|---|---|---|---|---|
| 5,400,248 A | * | 3/1995 | Chisholm | 705/12 |
| 5,608,620 A | | 3/1997 | Lundgren | 395/201 |
| 5,878,214 A | * | 3/1999 | Gilliam et al. | 709/204 |
| 5,924,072 A | | 7/1999 | Havens | 705/1 |

(Continued)

FOREIGN PATENT DOCUMENTS

| | | | | |
|---|---|---|---|---|
| JP | 11328275 A | * | 11/1999 | G06F/17/60 |
| WO | WO 00/02136 | | 1/2000 | |
| WO | WO 00/02138 | | 1/2000 | |
| WO | WO 00/13072 | | 3/2000 | |

(Continued)

OTHER PUBLICATIONS

"Recommender Systems", Resnick et al., Communications of the ACM, v40n3, p56–58, Mar. 1997.*
International Preliminary Examination Report, dated Jan. 3, 2003, corresponding to PCT Appl. No. PCT/US01/27138.

*Primary Examiner*—James P. Trammell
*Assistant Examiner*—Calvin Loyd Hewitt, II
(74) *Attorney, Agent, or Firm*—Dorsey & Whitney LLP

(57) ABSTRACT

A system, method, and apparatus for facilitating a self-organizing workforce of one or more workers through payment and recognition incentives, a set of configurable operating rules, and a set of credentials to represent the reputations and organizational capital of individual workers. The system includes a worksite having one or more configurable worksite rules where the one or more workers may work on an idea. Work includes posting to a discussion about the idea, voting on the idea, and recommending an outcome for the idea. Worker credentials for each worker are updated based on a worker's work on the idea within the worksite. The worker credentials include merit, which is a measure of the quantity, quality, and significance of work done; links, which is a function of what one worker thinks of another worker's work; wisdom, which reflects the worker's ability to spot a good idea; and, influence, which is a function of merit, links, and wisdom, and which reflects a worker's overall organizational capital within the system.

71 Claims, 20 Drawing Sheets

U.S. PATENT DOCUMENTS

| | | | |
|---|---|---|---|
| 5,960,173 A | | 9/1999 | Tang et al. ............ 395/200.31 |
| 5,995,951 A | * | 11/1999 | Ferguson .................... 706/10 |
| 6,055,511 A | | 4/2000 | Luebbering et al. .......... 705/14 |
| 6,100,035 A | | 8/2000 | Kauffman et al. ............. 435/6 |
| 6,119,147 A | * | 9/2000 | Toomey et al. ............. 709/204 |
| 6,122,630 A | | 9/2000 | Strickler et al. ............... 707/8 |
| 6,122,633 A | | 9/2000 | Leymann et al. ............. 707/10 |
| 6,125,351 A | | 9/2000 | Kauffman ...................... 705/7 |
| 6,223,177 B1 | | 4/2001 | Tatham et al. .................. 707/9 |
| 6,356,875 B1 | | 3/2002 | Green et al. .................... 705/9 |
| 6,362,837 B1 | * | 3/2002 | Ginn .......................... 715/751 |

FOREIGN PATENT DOCUMENTS

| | | |
|---|---|---|
| WO | WO 00/19369 | 4/2000 |
| WO | WO 00/20983 | 4/2000 |
| WO | WO 00/23933 | 4/2000 |
| WO | WO 00/26835 | 5/2000 |
| WO | WO 00/38079 | 6/2000 |
| WO | WO 00/38094 | 6/2000 |
| WO | WO 00/45584 | 8/2000 |
| WO | WO 00/63421 | 10/2000 |
| WO | WO 00/67191 | 11/2000 |
| WO | WO 01/03046 | 1/2001 |
| WO | WO 01/09803 | 2/2001 |
| WO | WO 01/45007 | 6/2001 |
| WO | WO 01/55932 | 8/2001 |
| WO | 2001/0014866 | 8/2001 |
| WO | WO 01/65456 | 9/2001 |

* cited by examiner

Worksite
View performance statistics for this worksite, the worksite rules that have been set by the administrator, and recent announcements from the administrator.

Employees and Premier Partners

Worksite Statistics

| | |
|---|---|
| Registered Workers: | 27 |
| Open Ideas: | 8 |
| Abandoned Ideas: | 0 |
| Summarized Ideas: | 0 |
| Total Merit paid: | 3000 |

↙ 32

Worksite Rules

| | |
|---|---|
| Value of 1 Merit point: | $1.00 |
| Merit coefficient: | 0.1 |
| Links coefficient: | 1 |
| Wisdom coefficient: | 10 |
| Influence-weighted voting: | No |
| Influence-weighted recommendation: | No |
| Allocation of Merit Payoffs to posting: | 50% |
| Allocation of Merit Payoffs to voting: | 50% |
| Minimum Influence for voting: | Level 0 |
| Minimum Influence for posting: | Level 0 |
| Minimum Influence for creating new idea: | Level 0 |

↙ 30

Cameron, welcome back. Log Out

MY DESK | WORKSITE | IDEAS | TASKS | WORKERS

Announcement:!
RULE CHANGE: Effective Monday, we will turn on influence-weighted voting for the first time since people have had a few weeks to establish their credentials. This means that the more you've accomplished, the more your vote matters on decisions we're making.

Read all announcements

The per-unit cost of goods of such a system aren't quite where we want it to be, yet, but with Moore's Law being what it is, we should get there within three years. Now's the time to start some field test, so that we're ready to roll Smart Packages out broadly by 2004.

62 CONT.

☐ ☑ Subscribe by Email-You will receive new posts to this discussion by email.

68 View: [Full ▼]  Sort By: [Thread ▼]  Filter: [0% ▼]  ⟳ Reload  ☑ Save these settings ⊙ No conclusion yet (SUBMIT)

⊙ View idea details

Retailers are missing 10-20% of sales because of inventory management problems — 66
| Post Credit=21.88% | Votes=4

YOUR VOTE
+3 +2 +1 0 -1
70 ⟋ ○ ⊙ ● ● ●

Sandra U. submitted Wednesday, mm/dd/yy 10:51:07 PM
Manufacturers and retailers both expend a lot of effort trying to get the right products to the right place at the right time. However, according to our own analysis, even the retailers who do the best job managing their inventory lose about 11% of sales because an item is not on the shelf when a consumer goes to look for it. I've attached a pivot table that shows the magnitude of the problem for each of our North American retailers.

⌘ Attachment: Retailer Inventory Mgmt. xls

◇ The problem is even worse on the weekends!
   Facts | Post Credit=3.13% | Votes=4
   Anonymous Poster submitted Wednesday, mm/dd/yy 10:56:14 PM
   Yes, and this problem is even worse on the weekends, when shoppers are emptying store shelves and the delivery trucks aren't arriving with fresh supplies.

YOUR VOTE
+3 +2 +1 0 -1
70 ⟋ ● ● ● ⊙ ●

🏳 Potato chips are the only chips we're ever gonna see on retail shelves
   Challenges | Post Credit=0.00% | Votes=3
   Lupe Z. Submitted Thursday, mm/dd/yy 11:01:08 AM
   Guys, this just isn't going to work. It's not even worth trying! It's just another solution looking for a problem... from those propeller heads in the Supply Chain group. I've been working with retail for 30 years now, and I should know, nobody's going to swallow this program.

YOUR VOTE
+3 +2 +1 0 -1
70 ⟋ ● ● ● ● ⊙

We have a retailer in Atlanta who wants to pilot this technology

VOTE HERE

| MY DESK | WORKSITE | IDEAS | TASKS | WORKERS |

92

View workers and their credentials. For each worker, Merit shows earnings to date, Links shows peer recruiting capability, Wisdom shows decision performance, and Influence shows organizational capital.

Sort By: Influence ▼ ⟳ Reload

94 →

Displaying workers with influence of Level 8 and higher

| User Name | Full Name | Merit | Links | Wisdom | Influence |
|---|---|---|---|---|---|
| • CameronW | Cameron W. | 250 | 5.6 | 0.80 | Level 10 |
| • LupeZ | Lupe Z. | 288.54 | 4.0 | 0.21 | Level 9 |
| • NatashaY | Natasha Y. | 201.81 | 3.1 | 0.76 | Level 8 |
| • KevinS | Kevin S. | 189.66 | 3.3 | 0.86 | Level 8 |
| • SandyU | Sandy U. | 202.17 | 3.9 | 0.61 | Level 8 |
| • TerryQ | Terry Q. | 229.28 | 3.6 | 0.44 | Level 8 |
| • YangX | Yang X. | 174.24 | 4.5 | 0.896 | Level 8 |

↑90  ↑98  ↑100

<<Back | Page 1 of 1 | Next>>

Cameron, welcome back. Log Out

METHOD, APPARATUS, AND MANUFACTURE FOR FACILITATING A SELF-ORGANIZING WORKFORCE

CROSS-REFERENCE TO RELATED APPLICATIONS

This application is related to and claims priority to and the benefit of U.S. Provisional Patent Application Ser. No. 60/229,928, entitled "Scalable Internet Platform to Organize and Perform Commercially-Valuable Work" filed on Sep. 1, 2000, which is hereby incorporated by reference in its entirety.

FIELD OF THE INVENTION

This invention relates generally to manufactures, apparatus, and methods for facilitating a self-organizing workforce, and more specifically to manufactures, apparatus, and methods for providing a scalable platform for allowing a group of people, such as employees, selected third parties, and a predetermined group of networked free agents, to organize and collaborate to perform, and receive compensation or other incentives in respect of, work for companies, research institutions, governments, and the like.

BACKGROUND OF THE INVENTION

A primary purpose of most companies is to organize people and money to innovate. Traditionally, the predominant method of organizing companies has been a centralized, hierarchical, command-and-control management structure (i.e. the organizational chart). Executives typically define a strategic framework for the company's business, identify key business objectives, and organize the company into functional groups. These groups are allocated resources—a manager, a budget, and a reporting staff. At each level in the organization, objectives are translated into tasks. Performance information flows up the management reporting structure, being filtered and summarized by managers at each level.

The problem with a traditional command-and-control management structure is that it is nearly impossible for an executive, a central decision-maker, to keep the organization optimized for maximum throughput, efficiency, and robustness. This is because no executive is working with the complete, real-time, tacit knowledge of every employee in the organization. As a consequence, while the organization may be occasionally optimized, it oscillates between two extremes: underutilization and instability. Underutilization occurs where the company's resources are poorly applied to solving a problem. An example of underutilization is two separate departments spending millions of dollars to solve a nearly identical problem—each unaware of the other's activities. Instability occurs where the company's resources are effectively applied to solving the wrong problem. An example of instability is vigorous and efficient execution of a project that is strategically flawed for reasons well understood to employees within the company or on the project itself. Nearly everyone who has worked at a company has an intuitive understanding of what causes these sub-optimal performance states: Among these are (1) inefficient communications (2) reward systems that are poorly aligned with desired results, and (3) politics arising from the organizational structure itself. Companies are constantly seeking new management techniques in an effort to solve these problems and to better organize themselves.

SUMMARY OF THE INVENTION

The present inventors believe that one such organizational alternative for companies is a complex adaptive system. A complex adaptive system is characterized as having a large number of highly connected, rationally bounded, individual agents who act to balance their own interests and the broader interests of their affiliated group. In this case, any or all of employees, independent consultants, business partners, and customers are independent agents, working on behalf of a company, which is their affiliated group. Nature, society, and the economy provide many examples of complex adaptive systems that function optimally without centralized control. Among these are how ant colonies forage for food sources by leaving pheromone trails and how a free market determines prices and inventories based on the individual needs of buyers and sellers. With the right set of distributed rules, such systems are self-organizing, self-optimizing, and highly scalable.

The present inventors recognize that it would be advantageous to allow people to organize as a complex adaptive system to perform work on behalf of companies. It is certainly not expected that companies will abandon a command-and-control management system. To that point, if a complex adaptive system is implemented as a software-based communication and collaboration system, it will allow companies to create a "virtual" corporate organization—with its own rules, behaviors, and results—that is a strong complement to the "real" corporate organization, providing the best of both organizational systems and perhaps even synthesizing them. The present inventors believe that, as an organizational system, a complex adaptive system will be highly suited to matters of innovation and strategy, where few rote answers exist and discussion and knowledge sharing are critical to success.

A system according to the present invention for facilitating a self-organizing workforce of one or more workers includes a worksite and a work module associated with the worksite. The work module is for enabling the one or more workers to work on at least one idea. The system further includes an idea definition module enabling the one or more workers to post the idea to the worksite. The idea definition module is associated with the worksite. The system further includes a worker module associated with the worksite, the at least one worker module for tracking at least one worker credential for the one or more workers. The at least one worker credential is a function of the one or more workers' work on the at least one idea.

More than one work module may be associated with the worksite. In one example, the work module includes a posting module such as a message board for the one or more workers to work on the at least one idea by providing at least one post discussing some aspect of the at least one idea. In another example, the work module includes a voting module for the one or more workers to work on the idea or the post by providing a vote on the merits of the idea or the post. The voting module may include at least one weighted voting selection such as a −1 voting selection, a 0 voting selection, a +1 voting selection, a +2 voting selection, and a +3 voting selection. In another example, the work module includes a recommendation module for the one or more workers to work on the at least one idea by providing a recommendation for the outcome of the at least one idea such as by selecting a summarization selection, an abandonment selection, and a further funding selection. In another example, the work module includes a linking module for workers to establish link relationships with other worker.

Worker credentials include: a link credential that is a function of the link relationship; a wisdom credential that is a function of the recommendation for the outcome of the at least one idea; a merit credential that is a function of the post and the vote; and an influence credential that is a function of the links credential, the wisdom credential, and the merit credential.

The worksite is associated with a worksite rules module for defining at least one worksite rule for the worksite. The worksite rules include: at least one configurable worker credential coefficient; a configurable percentage allocation of merit points for work performed in the posting module and a configurable percentage allocation of merit points for work performed in the voting module; an influence-weighted voting selection for scaling the one or more workers vote as a function of the influence credential, an influence-weighted posting selection for scaling the one or more workers post as a function of the influence credential, and an influence-weighted recommendation selection for scaling the one or more workers recommendation as a function of the influence credential; a minimum influence for posting selection for setting a minimum influence credential to access the posting module; a minimum influence credential to access the voting module.

A method for facilitating a self-organizing workforce of one or more workers according to the present invention includes the operations of providing a worksite having a set of worksite rules; providing a work module associated with the worksite for the one or more workers to collaborate on an idea; associating a worker credential with the one or more workers; and updating the at least one worker credential for the one or more workers as a function of the collaboration. More that one work module, worker credential, and idea may be associated with the worksite.

The method further includes receiving at least one post from a worker using the posting module, and displaying the at least one post in association with the idea. The posting module may include one or more descriptor selections for characterizing the post, the available descriptor selections including a disagree selection, a benefit selection, a challenge selection, an opportunity selection, a fact selection, or a correction selection.

The method further includes receiving a voting selection from a worker using the voting module to collaborate on the idea by providing a voting selection corresponding with the idea or the post, and displaying the voting selection in association with the at least one idea or the at least one post. The method further includes receiving a recommended outcome for the idea from a worker using the recommendation module to collaborate on the idea by providing a recommended outcome for the idea, and displaying the recommended outcome in association with the at least one idea. The recommended outcome may be taken by the administrator or automatically implemented by the system. The method may further include workers collaborating by establishing links to other workers using the linking module. Available link types include a positive link selection for establishing a positive link, a negative link selection for establishing a negative link, and a neutral link selection for establishing a neutral link.

A second method according to the present invention for facilitating a self-organizing workforce of one or more workers includes receiving a first post from a first worker, the first post having a vote total; receiving a vote on the first post from a second worker, the vote having an associated vote value; adding the vote value to the vote total for the post to determine a new vote total; receiving a second post from the second worker, the second post having a second vote total; receiving a second vote on the second post from a third worker, the second vote having an associated second vote value; adding the second vote value to the second vote total for the second post to determine a second new vote total; adding the new vote total by second new vote total to determine an overall vote total; and dividing the vote value by the overall vote total to determine a post credit for the first worker. The second method further includes determining if influence-weighted voting is selected; and after the operation of receiving a vote, if influence-weighted voting is selected, multiplying the influence credential by the vote value to influence weight the vote value. The second method further includes assigning a posting percent allocation of merit points; multiplying the posting percentage allocation of merit points to the post credit for the idea to determine an allocated posting merit; assigning a voting percent allocation of merit points; determining a vote credit for the idea; multiplying the voting percentage allocation of merit points to the vote credit for the idea to determine an allocated voting merit; and adding the allocated posting merit to the allocated voting merit to determine a total worker credit for the first worker. The second method further includes receiving a merit points assignment for the idea; and multiplying the total worker credit for the first worker by the merit points assignment for the idea to determine the total merit points for the first worker. In one example, the merit credential is associated with a pecuniary interest.

A third method according to the present invention is for a plurality of workers to collaborate on an idea and to receive compensation for the collaboration including: providing a message board having at least one idea posted thereon, the at least one idea having an associated number of merit points; providing a posting module for a first worker to provide a post of a discussion about the idea; providing a voting module associated with the post for additional workers to provide a vote on the post; and assigning a portion of the associated number of merit points to the first worker as a function of the post. In one example, the merit points are associated with a pecuniary interest. The third method further includes the operation of assigning a portion of the associated number of merit points to the first worker as a function of the vote. The third method further includes the operations of providing a linking module associated with the post for the additional workers to establish a link with the first worker, and providing a recommendation module associated with the post for the additional workers to submit a recommended outcome for the idea.

The third method further includes the operations of assigning at least one worker credential to the first worker and the additional workers. The worker credentials includes a merit credential, a links credential, a wisdom credential, and an influence credential. The merit credential is a function of the assigning a portion of the associated number of merit points, the links credential is a function of the link, the wisdom credential is a function of the recommended outcome, and the influence credential is a function of the merit credential, the links credential, and the wisdom credential. The worker credentials may be configured to evaporate.

A fourth method according to the present invention is for a third party to invest in a company product includes the operations of establishing a worksite with an idea associated with the company product; selling at least one merit point to the third party; and allocating the at least one merit point to the idea. The fourth method further includes the operation of compensating the third party in proportion to the operation of selling the at least one merit point to the third party. The fourth method further includes the operations of determining a revenue from sales of the product; and allocating a portion of the revenue to the third party in proportion to the operation of selling the at least one merit point to the third party.

A second system according to the present invention for facilitating the self-organization of a plurality of workers includes an idea definition module for defining an idea; a rules module for specifying worksite rules; a plurality of respective worker modules for the workers, each of the worker modules having a credential parameter and a capability of effecting work on the idea; and a work module responsive to the idea definition module, the rules module, and the worker modules for processing the work of the workers on the idea to enable collaboration amongst the workers in accordance with the worksite rules, and for determining the credential parameters in accordance with work of the workers on the idea and links between the workers. The second system further includes an additional idea definition module for posting an additional idea, the worker modules further having a capability of effecting work on the additional idea; an additional rules module for specifying additional worksite rules; and an additional work module responsive to the additional idea definition module, the additional rules module, and the worker modules for processing the work of the workers on the additional idea to enable collaboration amongst the workers in accordance with the additional worksite rules, and for determining the credential parameters in accordance with work of the workers on the additional idea and additional links between the workers. The capability of effecting work in each of the worker modules comprises a capability of vetting, further defining, criticizing, encouraging, focusing, voting, posting, identifying problems with the idea, identifying errors in the idea, describing a benefit with the idea, expressing thoughts in regard to the idea, or any combination thereof. The credential parameter in each of the worker modules comprises merit, link, wisdom, or influence. The worksite rules specified by the rules module comprises rules, incentives, settings, or any combination thereof.

A fifth method according to the present invention for facilitating the self-organization of a plurality of workers includes establishing rules of collaboration for the workers; establishing an idea for the workers to work on; associating worker credentials with the workers; monitoring collaboration of the workers on the idea under the rules of collaboration, each of the workers having an influence on the collaboration; determining the worker credentials as a function of the collaboration; and rewarding the workers as a function of the worker credentials. The fifth method further includes adjusting the influence of each of the workers on the collaboration based on the worker credentials. The collaboration includes evaluations by some of the workers of others of the workers; and the determining operation includes for a first one of the workers, determining a link credential for the first worker in accordance with evaluations of the first worker by at least some of the other workers, and further comprises, for a second one of the workers, determining a link credential for the second worker in accordance with evaluations of the second worker by at least some of the other workers. The collaboration may further include distribution of merit points to at least some of the workers; and the determining operation further includes, for a first one of the workers, determining a merit credential for the first worker in accordance with a first assignment of merit points by an administrator, and further comprises, for a second one of the workers, determining a merit credential for the second worker in accordance with a second assignment of merit points by the administrator. The collaboration may further include recommendations of abandonment or advancement of the idea by at least some of the workers and an action of advancement or abandonment taken by an administrator; and the determining operation further includes, for a first one of the workers, determining a wisdom credential for the first worker in accordance with whether a recommendation for advancement or abandonment made by the first worker matches the action of advancement or abandonment taken by the administrator, and further comprises, for a second one of the workers, determining a wisdom credential for the second worker in accordance with whether a recommendation for advancement or abandonment made by the second worker matches the action of advancement or abandonment taken by the administrator.

A sixth method according to the present invention for a worker to collaborate with a plurality of other workers includes: receiving a worker credential; evaluating an idea posted on a worksite; furnishing results of the idea evaluating step to a work module, the results of the idea evaluating step being weighed in accordance with the worker credential; evaluating comments of other workers on the idea, the comments of the other workers being posted on the worksite; furnishing results of the comments evaluating step to the work module, the results of the comments evaluating step being weighed in accordance with the worker credential; posting further comments on the idea to the worksite; and receiving an adjustment to the worker credential in accordance with evaluations by the other workers of the posted further comments.

BRIEF DESCRIPTION OF THE DRAWINGS

FIG. 3 is a screen shot illustrating a "worksite page" according to one embodiment of the present invention;

FIGS. 6A and 6B are screen shots illustrating a discussion about an idea according to one embodiment of the present invention;

FIG. 13 is a screen shot illustrating a "workers page" according to one embodiment of the present invention;

DETAILED DESCRIPTION OF EMBODIMENTS OF THE INVENTION

The present invention will now be described in detail with reference to various embodiments thereof, with some aspects of the invention being described in the accompanying drawings. Numerous specific details are set forth in order to provide a thorough understanding of the present invention. It will be apparent to those skilled in the art that the present invention may be practiced without some or all of the specific details, that operations may be rearranged, that some operations may be eliminated or performed in a different way, and that other changes may be made without departing from the spirit and scope of the present invention.

Figure 1:
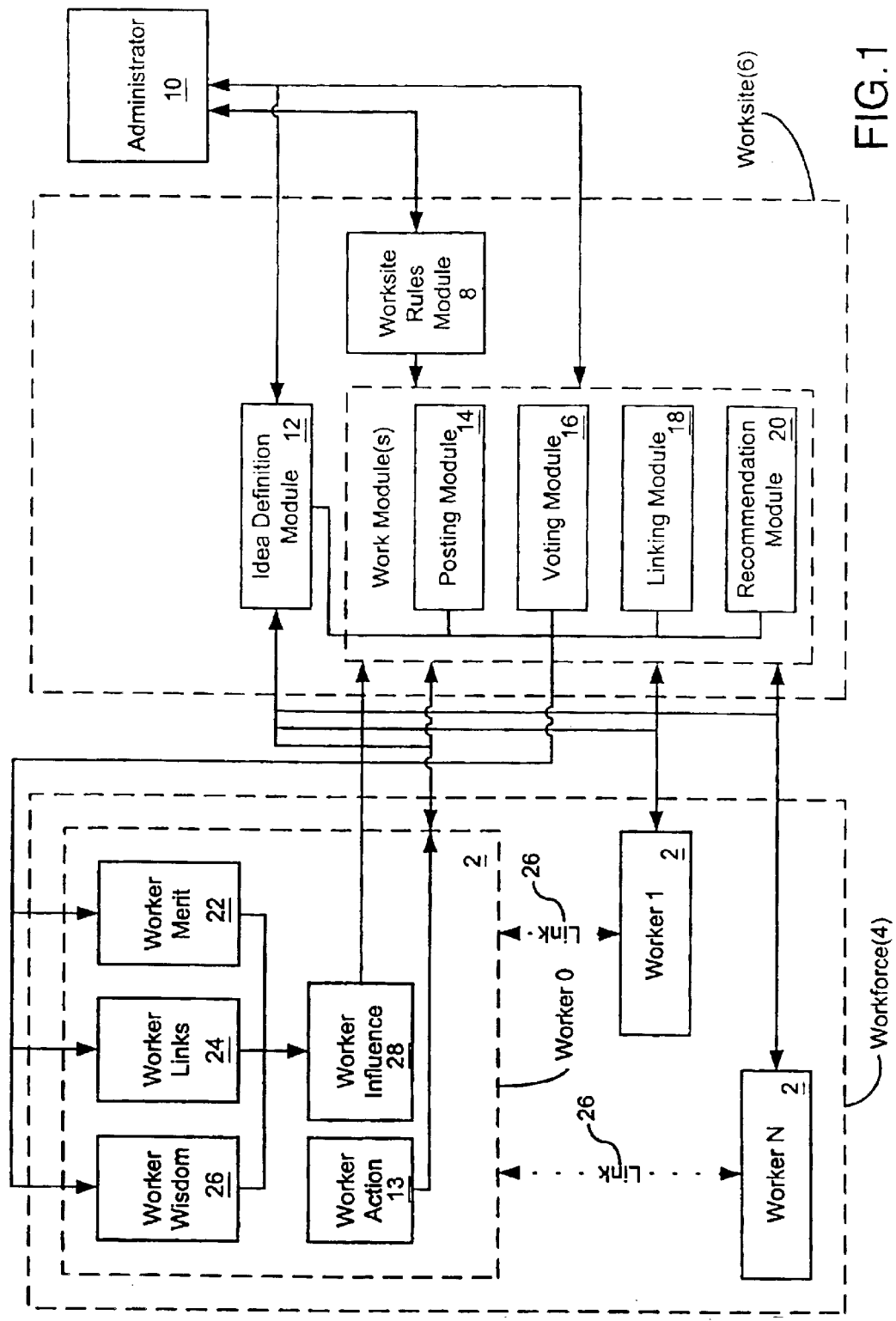
FIG. 1 is a schematic diagram illustrating one embodiment of a system according to the present invention.

Embodiments of the present invention tap the collective knowledge of a group of people to achieve some objective or to define an objective. Referring to FIG. 1, in one example, systems according to the present invention allow a group of workers 2 self-organize and form a workforce 4 under a system of rules and incentives that is different from that of the actual corporate structure. Within the system, a "worksite" 6 a collaboration space for which the organizational rules, incentives and other settings can be uniquely configured to achieve the desired online group behavior. These rules, incentives, and other settings are collectively referred to as worksite rules. In one example, a worksite rules module 8 is envisioned as part of the worksite 6, and is used to configure the worksite rules.

Workers 2 post an idea to the worksite 6, the idea perhaps representing a discrete problem needing a solution or a more general thought about a new opportunity needing further definition. As used herein, an "idea" or "opportunity" is an expressed project, problem, philosophy, strategy, alternative, commercially relevant thought, challenge, and the like that a worker, administrator, or other person involved with the system may post to a worksite to encourage workers to participate and otherwise "work" in the development of the idea, such as by vetting, further defining, criticizing, encouraging, focusing, voting, posting, identifying problems with an idea, identifying errors in an idea, describing a benefit with an idea, and otherwise expressing thoughts in regard to the idea. Other workers can then build upon the idea using the system. Promising ideas attract the attention of greater numbers of workers, and workers gravitate toward ideas that attract them. As workers contribute to ideas, they may gain reputation credentials as determined by forms of feedback from co-workers, actions taken by an administrator 10, and other system-level activity. These reputation credentials are referred to as worker credentials. The worker credentials are the system's method for automatically determining the organizational capital and status of each worker in the system. Worker credentials may increase or decrease the workers' privileges and powers, as determined by the worksite rules.

Workers with higher worker credentials gain influence in the system, allowing leadership to emerge. The workforce 4 itself thus becomes a vicarious selection system for producing better work on behalf of the organization. Workers 2 who have valuable subject matter knowledge, who are active contributors, who work constructively with their colleagues, and who are well-suited (by interest or by skill) for online collaboration are the workers who advance in the system. Accordingly, leadership is emergent in systems according to the present invention.

Systems implemented according to the present invention are scalable in that the worksite rules and worker credentials make the workforce largely self-managing. The worksite rules help to facilitate the collaborative behavior of an arbitrarily large workforce 4 that is otherwise not readily managed by a central decision-maker who assigns roles, responsibilities, and tasks to workers. Specifically, a traditional manager in a traditional company may have seven direct reports, and more layers of management are then needed to scale the workforce. However, using the systems according to the present invention, the administrator 10 may guide online collaborations involving dozens, hundreds, or even thousands of workers 2 by directly managing only the incentives and the worksite rules, and by intervening only to create desired behaviors rather than pre-determined outcomes for work. While command-and-control management of an organization becomes less effective as a workforce grows larger, systems according to the present invention become more effective. This is because the larger pool of workers available to contribute to or evaluate a piece of work results in more diversity of knowledge, more ideas, and a more thorough vetting of those ideas. In addition, systems according to the present invention allow for effective cooperation with partners, vendors, and customers, who fall outside of a company's own command-and-control structure and cannot possibly be managed in the same sense that an employee is managed.

An idea definition module 12 is connected with the worksite 6. The idea definition module 12 provides a means for the worker(s) 2, the administrator 10, and others to define and submit an idea to the worksite 6. After an idea is submitted to the worksite, the workers may begin working or taking action 13 on the idea. In one example, the work modules include a posting module 14, a voting module 16, a linking module 18, and a recommendation module 20. Generally speaking, the posting module 14 is used by workers to work on an idea through posting discussion about the idea. The voting module 16 is used by workers to vote on the merit of an idea or post. The linking module 18 is used by workers to establish a relationship with another worker, either positive or negative. The recommendation module 20 is used by workers to recommend an outcome for an idea.

The workers judge each other's work within the worksite, which affects one or more of a worker's credentials. The worker credentials may reflect a worker's general influence within the systems according to the present invention. The worker credentials include a merit credential 22, a links credential 24, a wisdom credential 26, and an influence credential 28, each credential and combination of credentials uniquely reflecting a worker's organizational capital within a worksite 6, across worksites, and generally within the systems provided by the present invention. In some embodiments, additional worksite rules may be created, either by the system vendor or by the worksite administrator 10.

The merit credential (merit) 22 provides a measure of the worker's cumulative earnings, as measured in merit points, and is therefore also a measure of value created by the worker within systems according to the present invention. A merit point may carry only a symbolic value, or some material recognition value, or have a monetary or other economic equivalent, as determined by the administrator 10. Depending on definitions in the work module, there are a variety of ways in which a worker 2 can earn merit. In systems according to the present invention, a worker can earn merit by earning credit for an idea which then receives a merit payoff from the administrator 10. In the event of a payoff to an idea from the administrator, the total merit points paid by the administrator are divided among the workers who participated in the discussion about that idea, proportionate to the credit out of a total of 100% credit that each worker has earned. Worker credit is determined by posting and voting mechanisms in one example, as discussed subsequently.

The links credential (links) 24, also referred to as "respect," provides a measure of a worker's trust and confidence among peers within the system. Links 26 are established from one worker to another worker based on the first worker's assessment of the second worker's work. In one example, depending on the worksite rules, links can be positive (+), neutral (0), or negative (−) depending on the assessment of the worker who creates the relationship. For example, a worker may choose to create a neutral link upon the first interaction with another worker, marking them as someone whom they have "met." Upon each subsequent interaction, there is an opportunity to upgrade or downgrade the relationship to that worker. In another example, depending on the worksite rules, links can be positive only. Such worksite settings depend on consideration of cultural factors among the online worker community.

Links 26 are useful to workers as a collaborative filtering system for browsing ideas. For example, if a worker creates links to three other workers, then it becomes possible for the worker to sort the list of all ideas according the involvement of those three workers. This is the benefit a worker derives from linking to another worker. There are also costs to the worker associated with linking indiscriminately to too many other workers: first, with too many links the worker may not enjoy relevant sorting and filtering of ideas and, second, depending on the worksite rules, the worker will typically increase the influence of other workers by linking to them.

The wisdom credential (wisdom) 26 reflects the worker's judgment about the potential for an idea to be valuable to the organization, and whether that idea can and will advance to a subsequent stage of development. Depending on definitions in the work module, there are a variety of ways in which a worker can earn wisdom 26. In systems according to the present invention, a worker can earn wisdom by recommending that an idea should be either abandoned or advanced, as by being summarized, and then having the administrator subsequently take the recommended action. Conversely, a worker can lose wisdom if the administrator subsequently takes an action on the idea that is different from what the worker recommended.

The influence credential (influence) 28 may give the worker access to certain powers and privileges, based on the worksite rules set by the administrator 10, and is a weighted calculation using any combination of the merit 22, links 24, and wisdom 26 worker credentials, again based on worksite rules set by the administrator. Generally speaking, a worker's influence 28 increases or decreases as merit, positive links, and wisdom increase or decrease, and the greater a worker's influence, the more important the worker is and the more weight a worker's opinion carries within the system. In one example, the administrator can enable or disable a worksite rule called "influence-weighted voting." If influence-weighted voting is disabled, all workers cast equally-weighted votes—an appropriate setting when an egalitarian collaboration environment is desired. Conversely, if influence-weighted voting is enabled, workers cast votes that are weighted according to their influence credential—an appropriate setting when leadership is desired. Within embodiments of the present invention, the more influence 28 that a worker establishes, then the more the worker is exposed to more and better opportunities. In another example, the administrator can set a worksite rule called "minimum influence to create new idea" to a threshold level of worker influence. Granting this privilege only to workers who have earned the threshold level of influence is one way the administrator can reduce noise in the collaboration by ensuring that only experienced workers can initiate a new discussion.

Figure 2:
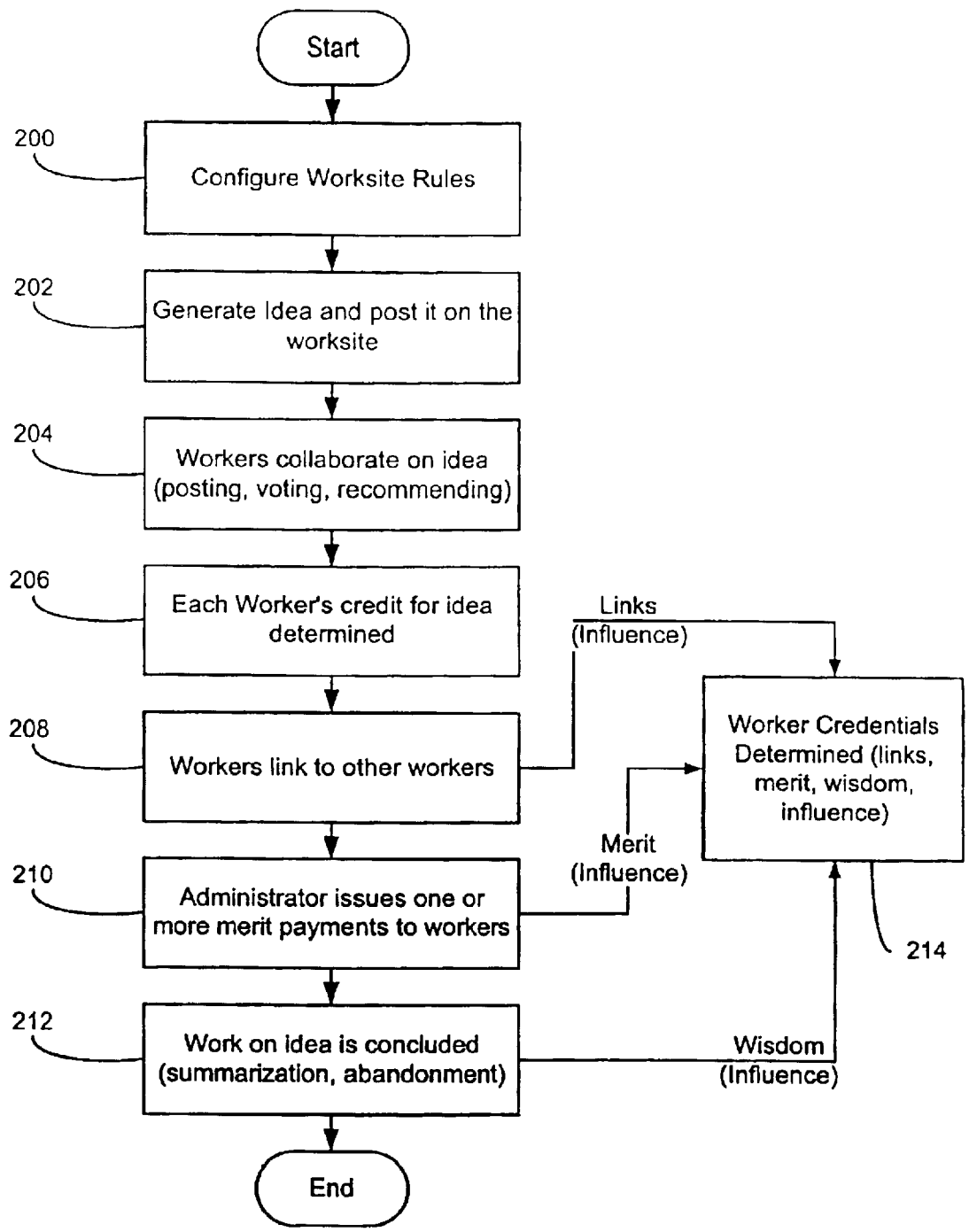
FIG. 2 is a flowchart illustrating the overall operations involved in the configuration and use of one embodiment of the present invention.

FIG. 2 is a flowchart illustrating the overall operations involved in the configuration and use of an embodiment of the present invention. In operation 200, the administrator 10 configures the worksite 6. The administrator is generally anyone who has overall control of the worksite. The administrator is connected with the worksite and has access to the worksite rules module 8. In one example, the administrator configures a set of worksite rules that define generally how work is performed in the worksite, the effect of work on the idea, and worker relationships with one another, and so forth.

Referring now to FIG. 3, an example of a worksite page is shown illustrating a list of worksite rules 30 and a list of worksite statistics 32. In one aspect of the present invention, worksite rules 30 are configurable to encourage different organizational behavior within the worksite 6. Accordingly, embodiments of the present invention provide for the explicit definition of the worksite rules. Moreover, in some embodiments, the worksite rules may be changed at any time by the administrator 10 to encourage different types of worker behavior in the worksite 6 at different times. In most instances, the worksite rules are applied equally to all workers 2, with a likely exception being the administrator, who can also use the system in a manner similar to other workers but who may not earn merit, in one example.

Embodiments of the present invention provide for multiple worksites 6 to be operated by a single organization, with each worksite potentially having a unique configuration of worksite rules. The rules for each worksite can be optimized to achieve some objective unique to the worksite. For example, an organization may implement two simultaneous worksites with different worksite rules configurations. In one worksite, workers 2 have the option of posting to discussions either using their name or anonymously. Worker identities, however, may limit total objectivity of the discussion. Therefore, in another worksite, the worksite rules are configured so that all workers post anonymously. Many of the workers in the two worksites will be the same people, so now the organization has two different collaboration spaces, each with its own rules and resulting group behavior. In another example, the organization may create another worksite specifically for employees in the Information Technology department, the purpose of which may be to segment the workers and projects from those of the Research & Development department. Other factors within the organization such as administrator responsibility and budgetary scope may also create a need for separate worksites.

Figure 4:
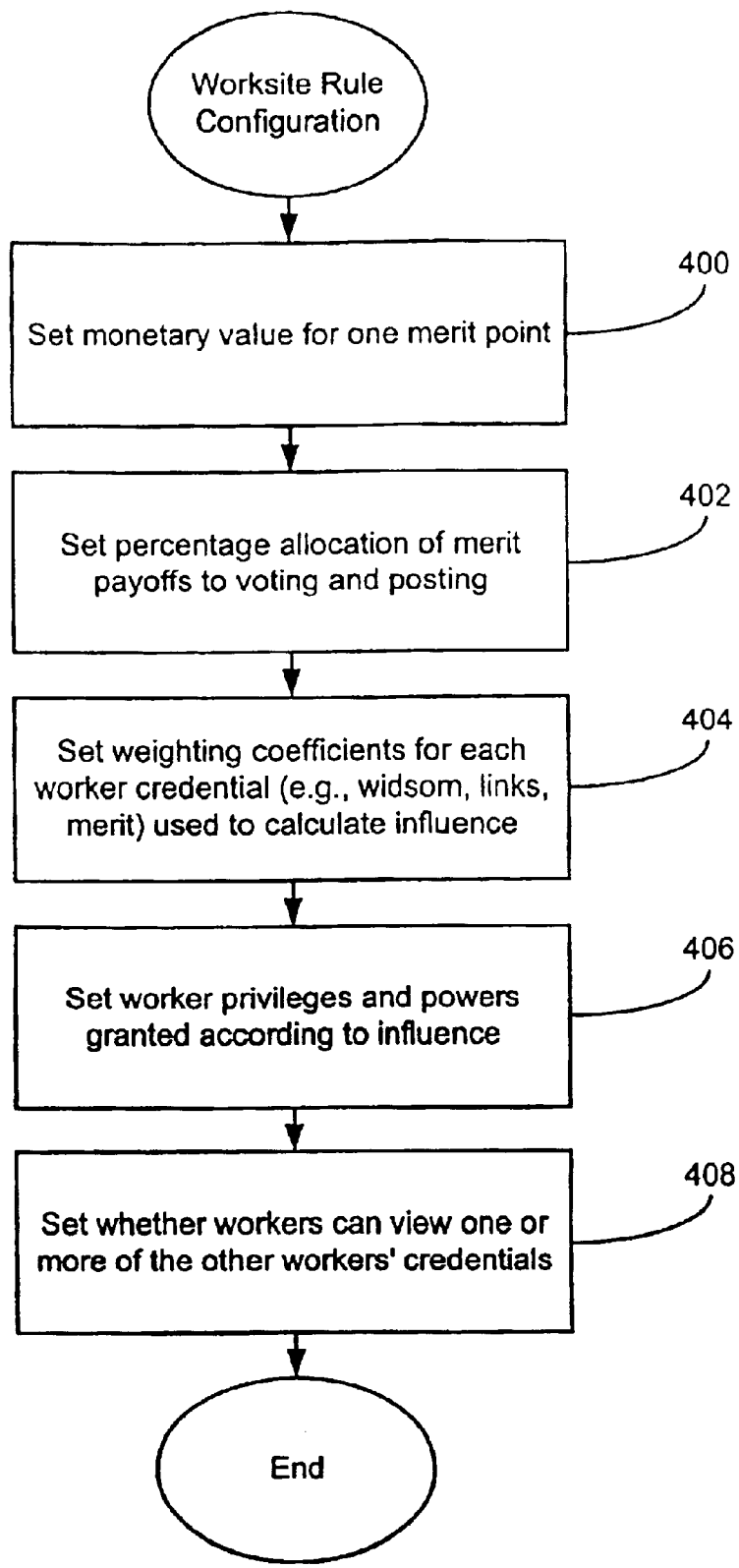
FIG. 4 is a flowchart illustrating the operations involved in the configuration of worksite rules according to one embodiment of the present invention.

FIG. 4 is a flowchart illustrating the operations involved in the configuration of the worksite rules. In operation 400, the administrator 10 sets a monetary value for one merit point. In embodiments of the present invention, merit may be exchanged at some time for real-world compensation. In the example illustrated in FIG. 3, the administrator has configured the worksite so that one merit point is worth one dollar. Alternatively, the administrator may define the value of a merit point as corresponding to some other real-world value, such as coupons redeemable at a store, shares of company stock, vacation days, etc. Merit point value encourages general use of the system by workers, and can be used to focus work on a particular idea that is important to the organization hosting the worksite.

In operation 402, the administrator 10 sets the percentage allocation of merit payoffs to various types of work, such as voting and posting. In one example, merit payoffs are allocated to posting and voting by assigning a percentage value of between 0–100% to each, the two values adding up to 100%. The worksite illustrated in FIG. 3 is configured so that 50% of merit points are allocated to posting and 50% of merit points are allocated to voting. For example, supposing an idea is allocated a total of 100 merit points to be paid on a future date, when the date occurs and the payoff is executed, 50 points will be allocated to a pool of posting activity and 50 points will be allocated to a pool of voting activity for the idea. The allocation of merit payoffs to different types of work provides a tool for the administrator to focus worker participation on certain activity within the worksite. For example, if the administrator believes that more voting activity is needed, the percent of merit allocated to voting activity in the event of a payoff can be increased, and the percent of merit allocated to posting activity in the event of a payoff can be correspondingly decreased.

In operation 404, the administrator 10 sets the weighting coefficient for each worker credential. In one example, merit 22, links 24, and wisdom 26 are assigned a weighting coefficient by the administrator. In the worksite illustrated in FIG. 3, merit has a coefficient of 0.1, links has a coefficient of 1, and wisdom has a coefficient of 10. Merit, links, and wisdom are used along with the associated coefficients to calculate influence, which is discussed in detail with the reference to FIG. 12. By assigning a weighting coefficient of zero to any of merit, links, and wisdom, the administrator can selectively exclude that worker credential from the influence calculation.

In some embodiments of the present invention, a worker 2 can establish positive, neutral, and negative links 26. Although not shown in FIG. 3, a coefficient is assigned to positive, neutral, and negative links to calculate a total links value, in the case where all three types of links are allowed by the worksite rules. Generally, the links coefficient affects individual predisposition to risk, the impact of contrarian workers, and the politeness and candor of communications in the system. For example, real-world experience has shown that workers create positive links perhaps ten times more frequently than negative links, which seem to be reserved for severe reprimand. If worksite rules are set such that positive and negative links have a weighting coefficient of 1 and −1 respectively, then, pragmatically, a negative link is of little consequence to the worker's overall influence, promoting higher risk communication behavior. If more conservative or diplomatic communication behavior is desired, the administrator could, for example, set worksite rules such that a negative link has a coefficient of −10, making the pragmatic consequence of a negative link on worker influence far more significant.

In general, the worksite rules involving weighting the various worker credentials for the worker influence calculation (see FIG. 12) can create different kinds of group behavior. For example, if the administrator considers output to matter most in determining leadership, merit 22 can be given a relatively high weighting. Or, if the administrator considers credibility among peers to matter most, links 24 can be given a relatively high weighting. Or, if the administrator considers analytical ability and judgment to matter most, wisdom 26 can be given a relatively high weighting.

In operation 406, the administrator 10 specifies worker privileges and powers granted according to influence 28. The administrator can configure worksite rules to allow certain worker privileges according to the influence level (0–10) that the workers have achieved. As used herein, a "power" is an ability of a worker that increases on a continuum proportionate to any level of worker influence and a "privilege" is an ability of a worker that is acquired at a discrete threshold of worker influence. Embodiments of the present of the invention allow the administrator to set privileges such as the minimum influence for voting, posting, creating a new idea, making a recommendation, and creating links to other workers and powers such as influence-weighted voting and influence-weighted recommendation.

If a minimum influence level is set for a particular type of work, such as voting, posting, and recommending, then that minimum influence level must be reached by a worker before that type of work can be performed by that worker. When influence-weighted voting is used, higher influence workers' votes have proportionally higher effects on the system as compared with lower influence workers' votes. When influence-weighted recommendations are used, workers with higher influence have a greater effect on the outcome of an idea. When influence-weighted links are used, a link from a higher influence worker is worth more than a link from a lower influence worker. When influence-weighting is not used, the effect of the various types of worker participation (voting, recommending, and the like) is equal across all workers in the worksite.

Setting a minimum influence for posting can be useful to optimize the quality of a discussion about an idea. Workers unfamiliar with an idea or the system may unwittingly harm the idea by providing posts with little or no value. For example, posting a message such as "I agree. That's great!" contributes very little to the discussion about an idea because it does nothing to move the idea forward. Other workers that read the post will, for the most part, have wasted their time. By setting a minimum influence on a per worksite basis, the administrator can effectively force less accomplished workers to first work by voting and thereby gain influence, which gets them into the habit of carefully evaluating what everyone has already said before they speak themselves. Only those workers who start off with good voting habits will earn the future right to post.

In addition, the administrator 10 may set the minimum influence for publishing a worker profile, for viewing all workers (users below this threshold may see only a filtered list of top workers depending on the administrator's setting), for publishing a merit payoff (this feature allows the administrator to set a "budget" or limit of merit points workers can allocate by all influence levels 0–10), for creating or editing an idea name and description (workers can create or edit the name and description of an idea based on the full discussion that has occurred after exceeding this threshold), for flagging an idea as abandoned or summarized, and for modifying or expanding idea categorization, or summarizing an idea.

Finally, in operation 408, the administrator specifies user interface settings that affect worker collaboration behavior.

Although not illustrated in FIG. 3, in one example, the administrator can choose to have merit 22, links 24, wisdom 26, and influence 28 displayed. Having workers see other workers' credentials allows them to detect the emergence of leaders in the system and allows workers to perceive others workers' successes and failures. On the other hand, not seeing other workers' credentials can foster egalitarian relationships. In general, a person known to have a strong reputation is less readily challenged by others than a person with a weak or unknown reputation. The same dynamics are true within systems according to the present invention. Such dynamics are viewed neither as good nor bad, per se. Rather, they are simply viewed as a portfolio of behavioral tools available to the administrator to suit the organization's collaboration purposes.

As illustrated in FIG. 3, whenever the administrator changes the configuration of the worksite, an announcement 34 is posted on the worksite page through an automatic or manual process. In this example, the announcement indicates that influence-weighted voting is going to be turned on (enabled). As the announcement indicates, in some examples, the worksite might be initially configured with influence-weighted voting disabled because workers have yet to establish any credentials. After some time, however, when workers have established credentials the administrator may choose to enable influence-weighted voting, which allows the more accomplished workers' votes to have greater influence in the worksite.

Figure 5:
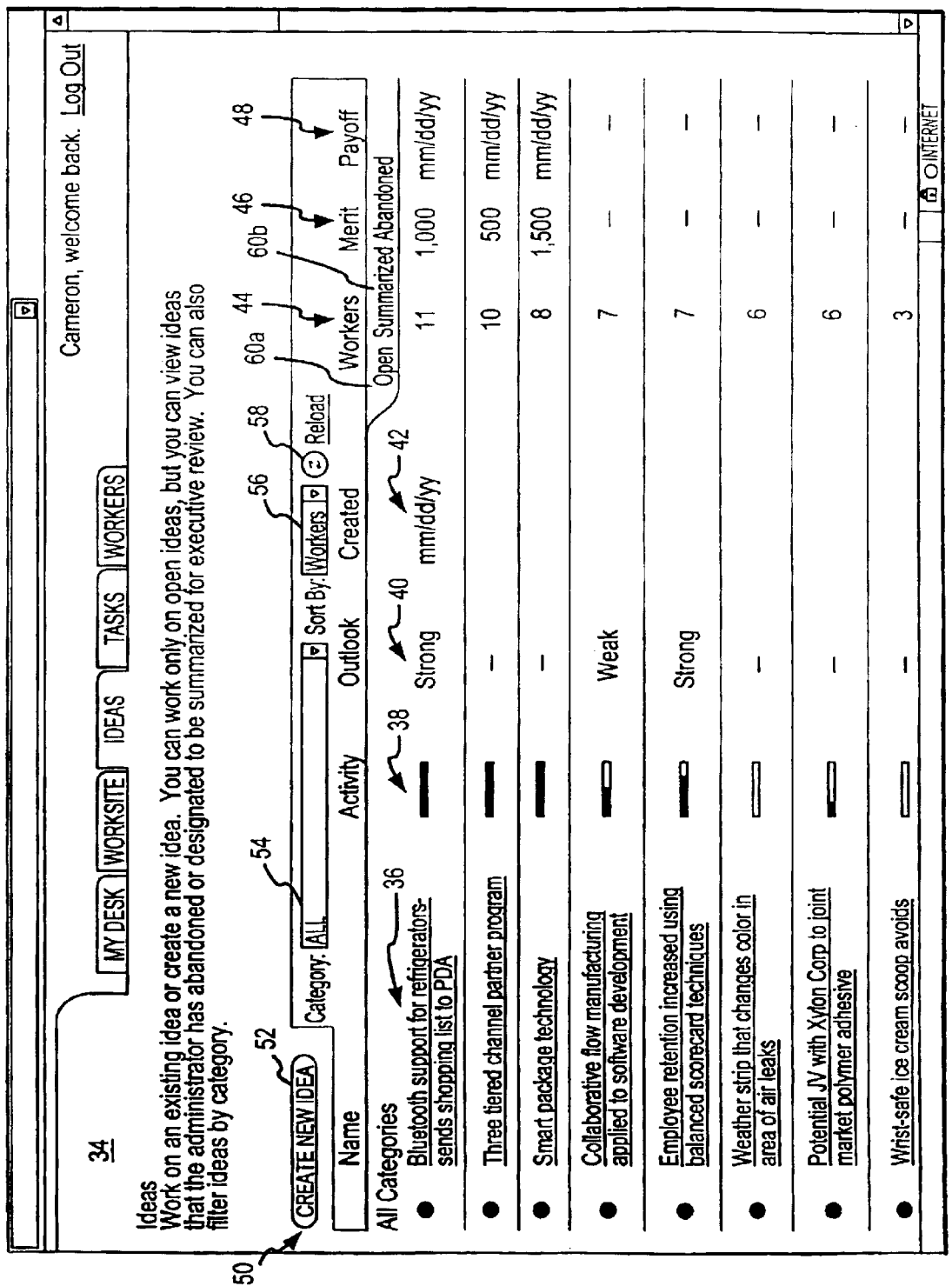
FIG. 5 is a screen shot illustrating an "ideas page" according to one embodiment of the present invention.

Referring again to FIG. 2, in operation 202, an idea is typically generated and posted to the worksite by the administrator 10 or a worker 2. FIG. 5 illustrates one example of the idea definition module 12 implemented or an "ideas page" 34 that is used for generating and posting ideas to the worksite according to aspects of the present invention. In some embodiments, the ideas page 34 is the first page that is displayed when a worker logs into the system and is the page where all of a worksite's ideas are listed, where workers go to work on an idea, where workers go to find out the status of an idea, and where workers go to create a new idea.

Each idea listed on the ideas page includes a descriptive name 36, likely written by the person, worker or administrator, who first entered the idea in the system. Generally, the idea name provides a brief description of the subject matter of the idea. In one example, each idea provides a link to a page or pages illustrating the work performed on the idea.

An activity bar 38 is associated with each idea. In one example, the activity bar fills-in to indicate the volume of discussion about the idea relative to other ideas in the worksite. For example, an idea with a lot of posting and voting, such as the first three ideas shown in FIG. 5, will have a full activity bar, and an idea with little or no discussion, such as the sixth and seventh ideas, will be slightly full or empty. The level of activity for any particular idea provides some insight as to the attractiveness of the idea. Generally, ideas with a lot of activity might indicate that the idea is good, interesting, has merit points associated with it, is supported by workers, and the like. In some instances, an idea might at first seem promising and have a lot of activity associated with it, but discussion about the idea may ferret out issues that diminish the initial promise of the idea. Nevertheless, such a finding is also valuable. Conversely, discussions about an idea that at first appear to lack direction later may produce valuable results.

Complimenting the activity bar, an outlook column 40 provides insight into what workers think so far about an idea. In one example, there is a "strong" outlook, a "weak" outlook, and a neutral or "– –" outlook. The outlook for each idea is a function of the collective opinion of the workers involved with the idea. An idea with a strong outlook indicates that the workers believe that the idea should be summarized or written up for executive review. On the other hand, an idea with a weak outlook indicates that the workers believe that the idea should be abandoned. If influence-weighted recommendation is turned on, then high influence workers will have a greater effect on the outlook of an idea.

Figure 6A:
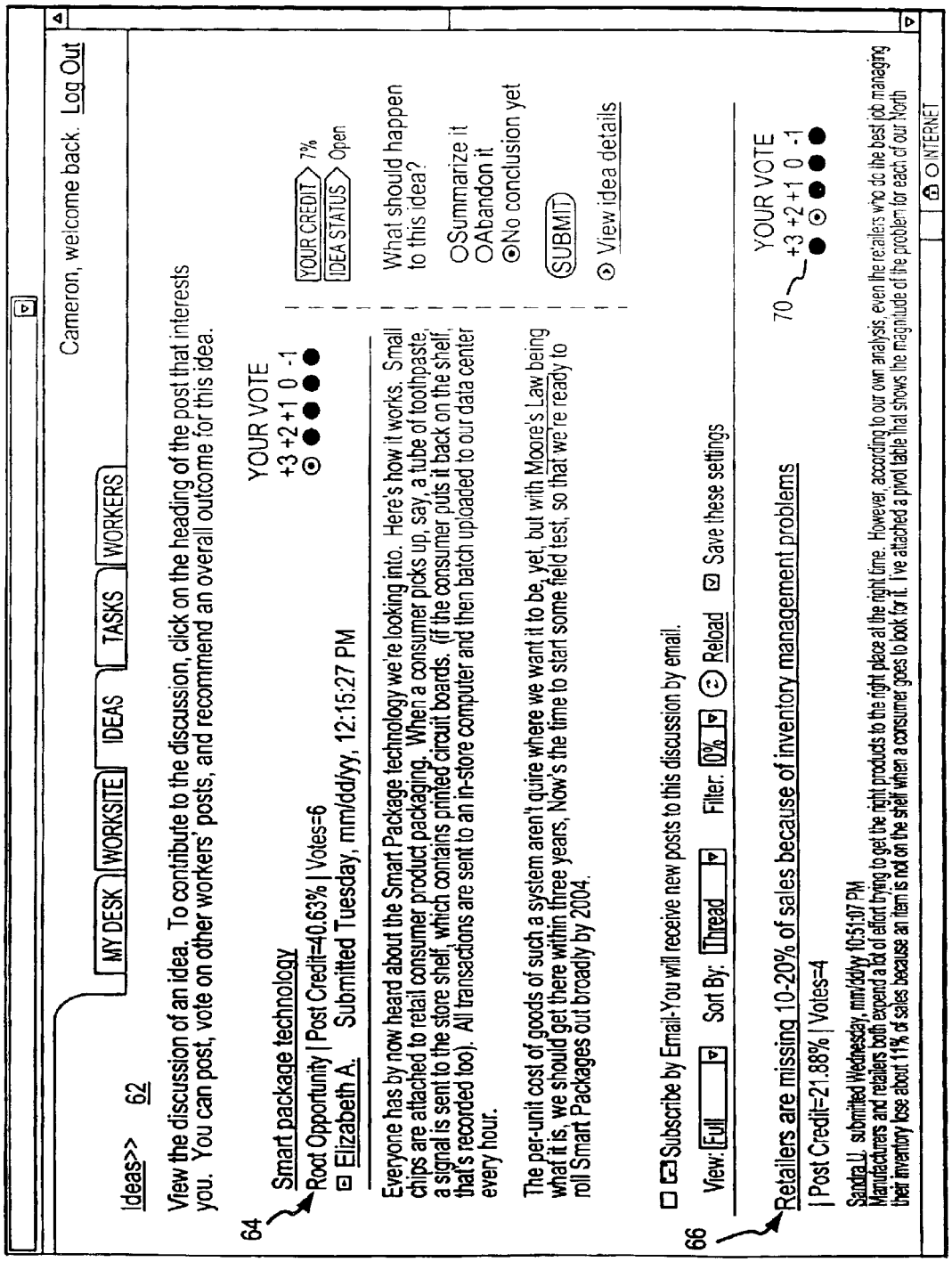

Outlook is determined by workers optionally making their recommendation using the recommendation module 20, in one example, about whether an idea should be summarized or abandoned on the view an idea page, as shown in FIG. 6A. A recommendation to summarize the idea is counted as a value of +1, and a recommendation to abandon an idea is counted as a value of –1. These values are averaged across the recommendations of all workers participating. In one example, if the average recommendation by all participating workers is greater than 0.3, then "strong" is displayed on the ideas page, and if the average recommendation is less than –0.3, then "weak" is displayed on the ideas page, and if otherwise, "–" is displayed on the ideas page. If influence-weighted recommendation is enabled, then each recommendation of +1 or –1 is multiplied by the influence value of the worker to calculate the recommendation value for that worker. For example, if a worker with a raw influence value of 7.9 recommends an idea should be abandoned, a value of –7.9 is added to the sum of all recommendations.

The date 42 that each idea was created is specified on the ideas page 34. A worker can use the created date in conjunction with other portions of the idea page and other pages to get a general feel for the idea. For example, an old idea with little activity might indicate that workers do not consider the idea a good one, whereas a recently created idea with little activity might simply indicate that workers have not yet worked on the idea. In contrast, a recently created, highly active idea might indicate that the idea is especially promising.

Still in FIG. 5, the ideas page 34 further indicates the total number of workers 44 that have worked on each idea. For example, eleven workers have worked on the first idea listed. In one example, this count of workers is calculated as the sum of all unique workers who have either posted to the discussion or voted on a post in the discussion. As with the created date, the number of workers working on any given idea is a further indication of the quality of the idea.

The merit amount 46 and the payoff date 48 for the merit are also identified for each idea listed on the ideas page. Some ideas may not have associated merit points and a payoff date, depending on whether merit points have been allocated by the administrator, a worker, or others. Some ideas that were not originally funded with merit may be funded after some work on the idea has been performed and perhaps the idea has proven to be promising, such as by having a strong outlook, a large amount of activity, etc. As discussed, each worker that positively contributes to an idea will receive some portion of the merit points on the payoff date. As discussed in more detail below, the other workers in the system determine how much value a particular worker has added to an idea, and what portion of the merit points the worker will receive, through a voting process.

The toolbar 50 on the ideas page 34 includes a create new idea button 52 for defining a new idea, a filter 54 for sorting through ideas by categories, and a sort selection 56 for sorting the idea list by any of the columns with the new sort being displayed after the refresh button 58 is selected. Open ideas 60a, summarized ideas 60b, and abandoned ideas 60c may be viewed by clicking one of the associated links 60a–60c on the toolbar.

Referring again to FIG. 2, in operation 204, workers collaborate on an idea. Referring now to FIGS. 6A and 6B, an example "view an idea" 62 page is shown illustrating some work performed on the "smart package technology" idea, which is the third idea listed on the ideas page 34 illustrated in FIG. 5. The view an idea page is accessed by selecting the smart package technology (SMT) link illustrated in FIG. 5. The view an idea page uses a message board metaphor where workers may post messages discussing the idea, with the messages being organized in threads. Generally, a thread is a series of related posts discussing some part of the idea. A root opportunity 64 is the first post in the discussion and is shown at the top of the view an idea page. The root opportunity is created using the create new idea button 52 discussed (see FIG. 5). In the SMT example, the view an idea page shows that the SMT idea was submitted by hypothetical worker Elizabeth A., Tuesday, mm/dd/yy.

A worker 2 can scroll down the view an idea page 62 to read the various posts discussing the idea. A first post 66 illustrated most clearly in FIG. 6B, shows a typical post discussing some aspect of the SMT idea. The first post includes a subject line 68, which is also a link for the workers viewing the post to submit their own post. As with the root opportunity 64, the worker that authored the post (Sandra V.) is identified along with the date of the post. Alternatively, the author of the post can choose to post it anonymously, which will not affect their post credit. A post may include further discussion, an attachment related to the idea, or both.

From the view an idea page, workers may vote on the posts, which is considered a form of work that may earn merit, depending on the worksite rules. A vote for the post indicates how valuable a given worker believes the post is to the overall discussion of the idea. In this example, there are six votes for the root opportunity post and four votes for the next post. A "Your Vote" section 70 of the view an idea page 62 shows whether the worker viewing the post voted on the post, and what their vote was. In one example, a worker may vote −1, 0, +1, +2, or +3 for a given post. A negative vote indicates that the worker believes the post contributes negatively to the discussion, a 0 vote indicates that the voter believes the post does not help or hurt the discussion, and degrees of positive voting (+1, +2, or +3) indicate the worker believes that the post contributes positively to the idea. In this example, worker Sandra V. selected +2, providing a positive vote for the root opportunity post.

A higher resolution of positive values (e.g., +1, +2, and +3) is provided because, in general, workers more frequently perceive other workers' posts to have some positive value. In another example, a voting slide bar user interface allows workers to vote a continuum of values from positive to negative, rather than a set of discrete integer values, for a higher resolution of vote values. Each worker is allowed one and only one vote per post, but in one example a worker can change their vote on a post up until the time that the idea is closed for discussion (either abandoned or summarized). In one embodiment, a worksite rule is available allowing the administrator to determine whether a worker can revise their previous vote on a post.

Figure 7:
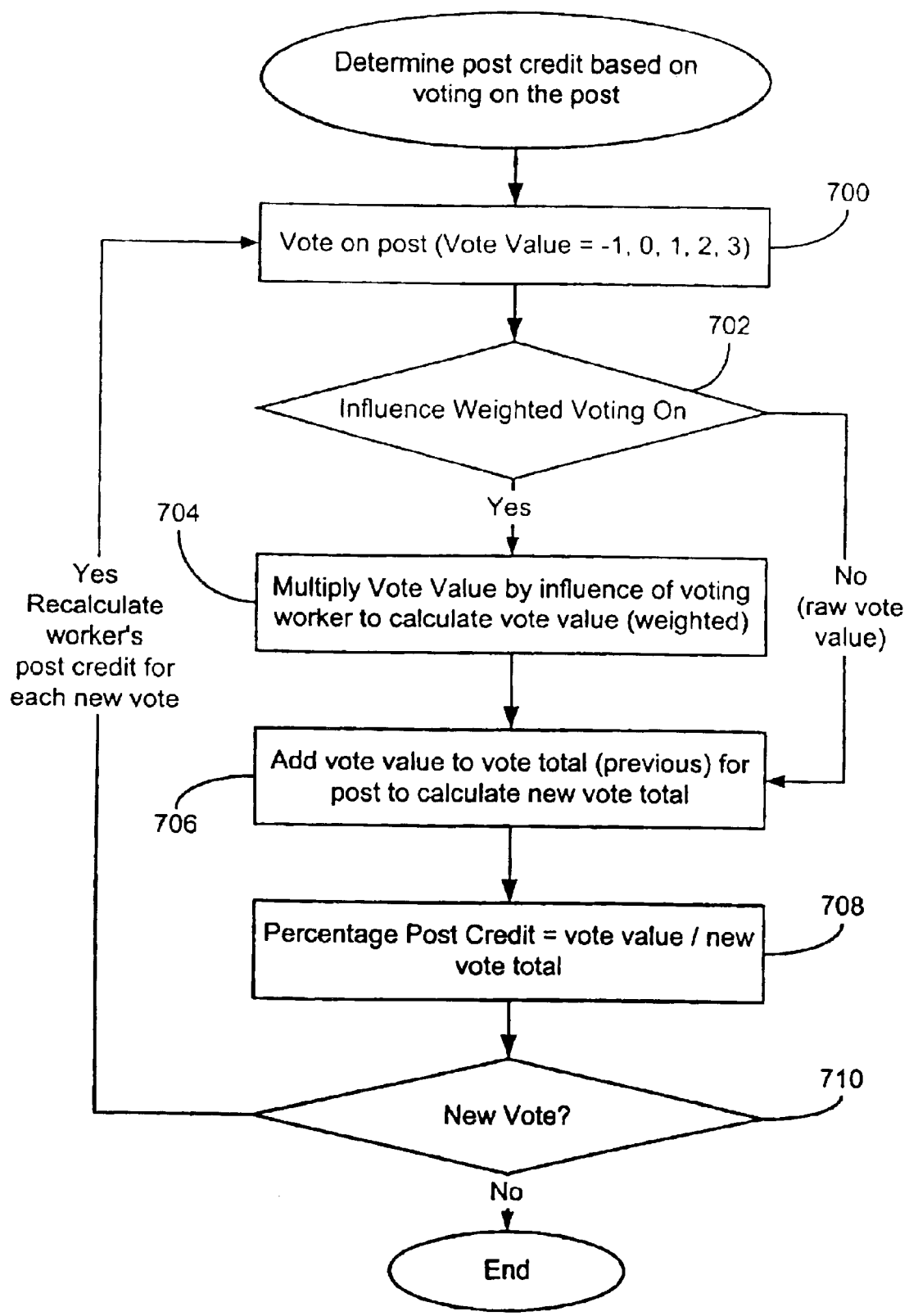
FIG. 7 is a flowchart illustrating the operations involved in determining the credit for each post in a discussion, according to one embodiment of the present invention.

Typically, all of the votes for a particular post as well as all other votes on all other posts within the idea discussion are used to determine the post credit for that post. Each post is attributed to one worker, and one worker may have any number of posts, each potentially earning a post credit. Referring to FIG. 7, a method for determining post credit for a single post based on all worker voting activity within the idea discussion is illustrated according to one aspect of the present invention. In operation 700, a worker votes on a post as discussed above. In one example, the vote may have a value of +3, +2, +1, 0, or −1. In operation 702, it is determined whether influence-weighted voting is enabled. In operation 704, if influence-weighted voting is enabled, then the vote value from operation 700 is multiplied by the worker influence of the worker that cast the vote to obtain a weighted vote value. For example, if a worker has a raw influence of 3.3, and casts a vote for a particular post of +2, then the weighted vote value is 6.6. The system may be configured so that the raw influence value (see FIG. 12) is used as the multiplier in operation 704 or the worker's influence level (0–10) (see FIG. 12) is used.

In operation 706, the vote value is added to the vote total for the post. For example, if the vote total for the post is 100, then 6.6 is added to the post to result in a new vote total of 106.6. If, in operation 702, influence weighted voting was not enabled, then the new total would be 102 (previous total (100)+2=102).

In operation 708, the percent credit for the post is determined. In one example, the percent credit for the post is the total vote value for that post divided by the total vote value for all posts in the discussion. For example, if the vote total for all posts within an idea discussion is 1.575.2, the vote total for a post is 106.6, then the post credit for the post is 106.6/1,575.2=6.77%.

Figure 9:
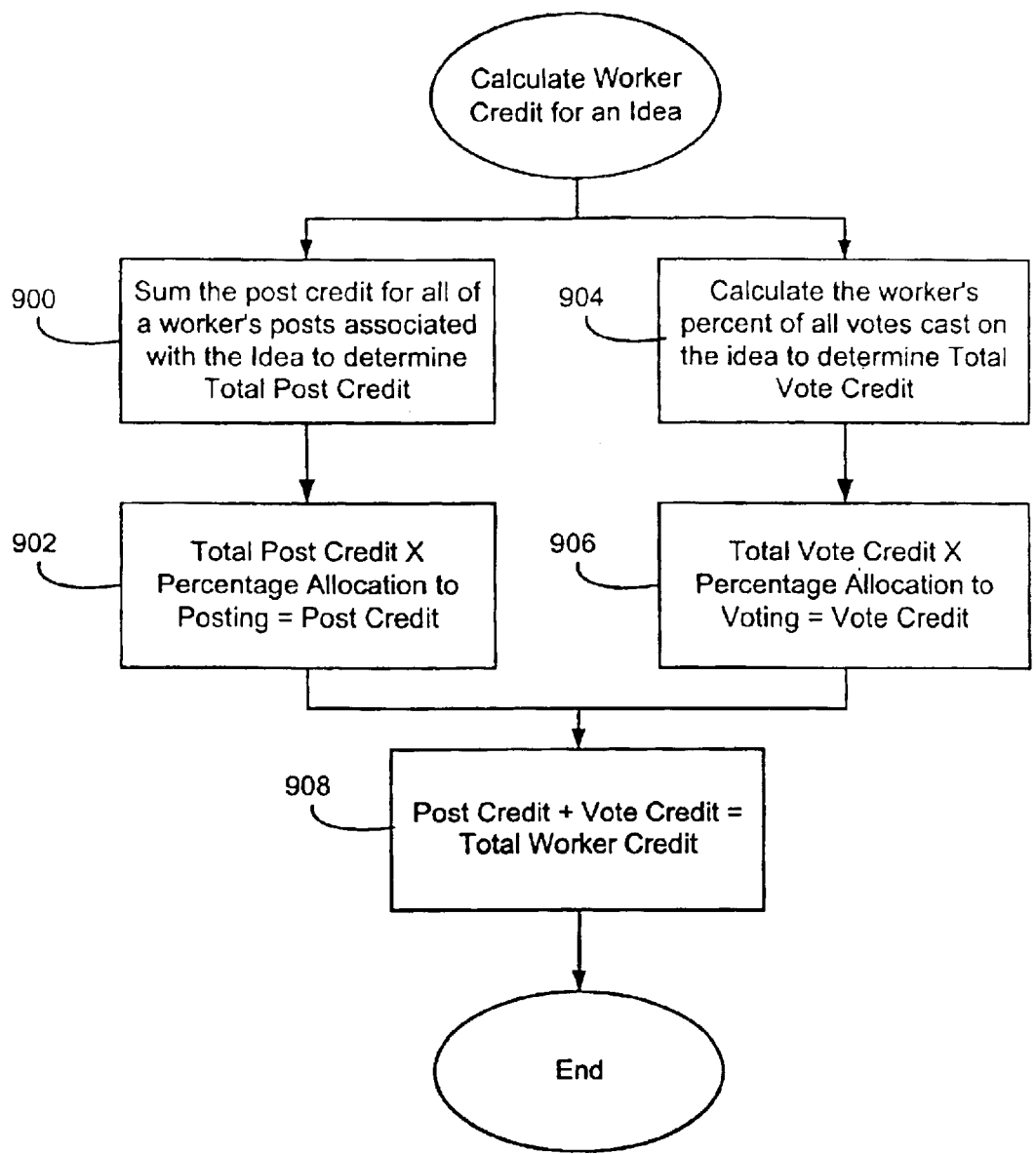
FIG. 9 is a flowchart illustrating the operations involved in determining a worker's credit for an idea according to one embodiment of the present invention.

In operation 710, every worker's overall credit for posting and voting associated with a particular idea discussion is recalculated whenever any worker casts a vote on a post in that discussion, as described in FIG. 9.

Figure 8A:
FIGS. 8A and 8B are screen shots illustrating a page where workers contribute to a discussion according to one embodiment of the present invention.
Figure 8B:
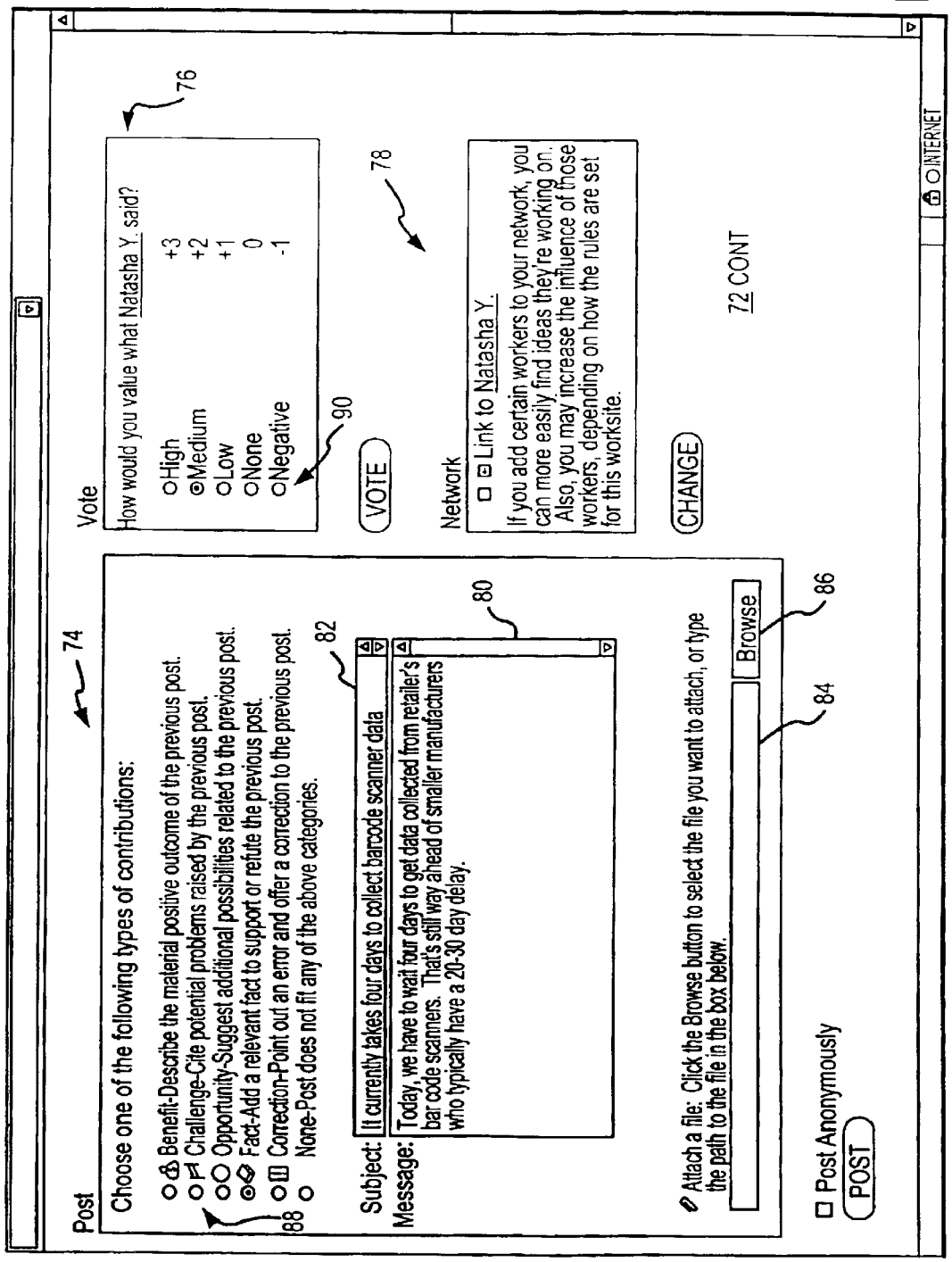

Referring again to FIGS. 6A and 6B, by selecting the subject line link for a post, a worker accesses a "contribute to idea" page where they may author a post, vote on a post, and otherwise work on the idea. FIGS. 8A and 8B illustrate one example of a contribute to idea page 72 associated with the SMT idea illustrated in FIGS. 6A and 6B. The contribute to idea page includes the previous post description (the post related with the selected subject line), a post section 74 (e.g., posting module 14) for writing a new post, a vote section 76 (e.g., voting module 16) for voting on the previous post, and a links section 78 (e.g., links module 18) for establishing a link with the author of the previous post.

The post section 74 includes a message box 80 for drafting the text of the post, a subject line box 82 for drafting the text of the subject line, and an attachment box 84 and browse button 86 for selecting an attachment to go along with the new post. The post section also includes one or more buttons 88 to classify the new post. The classification buttons include: a "benefit" button, which if selected indicates that the worker believes the new post describes the material positive outcome of the previous post; a "challenge" button, which if selected indicates that the worker believes that the new post cites potential problems raised by the author of the previous post; an "opportunity" button, which if selected indicates that the worker believes the new post suggests additional possibilities related to the previous post; a "fact" button, which if selected indicates that the worker believes the new post adds a relevant fact to support or refute the previous post; a "correction" button, which if selected indicates that the worker believes the new post points out an error and offers a correction to the previous post; and a "none" button, which indicates that the worker believes that the subject of the new post does not fit in with any of the available classifications or that the worker chooses to not classify the new post. Selecting any of the classification buttons 88 will include an identifying icon, such as a bag of money for a benefit, a hurdle for a challenge, a key for an opportunity, etc. next to the new post when it is displayed on the view an idea page.

In another example, the post section includes buttons called "agree", "disagree", and "no opinion" which allow a worker to qualify how their new post relates to the previous post. The agree button, if selected, indicates that the new post describes a similar view to the previous post. The disagree button, if selected, indicates that the new post describes a contrasting view to the previous post. The "no opinion" button, which in one example is the default selection, indicates that neither the agree nor disagree classifications are appropriate. Oftentimes, posts contain the keywords "I agree" or the like as workers on their own initiative articulate the relationship of their viewpoint to the previous post. By formalizing these agree/disagree post classifications, systems according to the present invention will be better equipped to analyze threaded discussions for consensus or difference. This analysis in combination with value analysis of posts, depth of threads, and textual analysis of keywords will facilitate summarization by extracting important concepts from a discussion.

Referring still to FIGS. 8A and 8B, the voting section of the contribute to idea page provides five buttons 90 for voting on the previous message similar to those described with reference to FIGS. 6A and 6B. The voting buttons include: a "high" (+3) voting button, which is selected if the worker believes the previous post has a high value; a "medium" (+2) voting button, which is selected if the worker believes the previous post has a medium value; a "low" (+1) voting button, which is selected if the worker believes the previous post has a low, but still positive, value; a "none" voting button, which is selected if the worker believes the previous post has very little or no value; and a "negative" voting button, which is selected if the worker believes that the previous post has a negative value. As a hypothetical example, if a worker posts to an idea discussion saying something to the effect of "this idea is terrible" without supporting the claim, then such a comment may actually harm the discussion by resulting in additional posts without any constructive content. In one example, the credit for a post is never less than zero, but negative post credit can cause a deficit, requiring more positive offsetting votes before the post credit rises above zero.

Voting is considered a form of work, and is one component of the present invention that facilitates collaborative behavior amongst workers. Voting allows a worker's peers in the worksite to collectively indicate the value that the worker's post has added to the overall discussion about the idea. When a post is voted on, it earns a percent credit among all the posts related with the idea, which is used to determine the amount of merit that will be allocated to the worker that created the post when merit is paid to the idea.

Referring again to FIG. 2, in operation 206, a worker's credit for an idea is determined. Referring to FIG. 9, one method for determining a worker's credit for an idea is illustrated according to aspects of the present invention. In operation 900, the system sums the posting credit for all posts from a particular worker about an idea. For example, referring to the "smart package technology" example illustrated in FIG. 6A, assuming hypothetical worker Elizabeth A. has only one post, the posting credit is 40.63% of the total posting credit. In operation 902, the posting credit from operation 900, is multiplied by the allocation of merit to posting determined by the administrator. Referring to the example worksite illustrated in FIG. 3, the administrator has allocated 50% of merit to posting, and 50% of merit to voting. Accordingly, with a posting credit of 40.63%, the worker's posting credit for the idea would be 50%×40.63%= 20.32%.

In operation 904, the worker's percent of all votes cast on the idea discussion is determined. In one example, if 100 total votes are cast, with a worker having cast five votes, then the worker has cast 5% of the votes for the idea. In operation 906, the voting credit for each worker is determined. In one example, the voting credit is the worker's percent of the total votes cast multiplied by the administrator's allocation of merit to voting. Referring to the example above, with 50% of merit allocated to voting, the worker has voting credit of 2.5%.

In operation 908, the worker's total credit is determined. In one example, the worker's total credit is the sum of the posting and the voting credit for the idea. Accordingly, in the example illustrated above, the worker's total credit would be 20.32%+2.5% =22.82%. In one embodiment the total worker credit for each worker is recalculated each time any worker votes on a post within the idea, which would change the total credit for most participating workers, with a few exceptional cases. Alternatively, the worker's credit is determined when the idea is closed.

Referring again to FIG. 2, in operation 208, workers link to other workers. Referring to the contribute to idea page illustrated in FIGS. 8A and 8B, the links section 78 allows the worker to establish a link 26 with the author of the previous post. For example, Sandra V. may link to Elizabeth A. or vice versa. Various configurations of the links section are possible. In one example, the links section will include a "positive" button which is used if the worker believes the author of the previous post provided, for example, a well thought out post that contributed to the overall discussion of the idea; a "neutral" button, for establishing a neutral link with the author of the previous post; and a "negative" button which is used if the worker believes the author of the previous post provided, for example, a poorly thought out post that did not contribute to the overall discussion of the idea.

As with a vote, the link to the author of the previous post may be changed at any time. For example, initially the worker might select the "neutral" link, but upon further thought realize that perhaps the previous post was quite insightful and change the link to "positive." Unlike a vote, however, a links relationship is from one worker to another and is not associated directly with one particular idea discussion. This provides for longitudinal relationships among workers, over various ideas and over time.

As an additional method to recruit workers to potentially valuable ideas, a worker may attempt to recruit other workers who have previously linked to her by selecting an option on the view an idea page that recommends the idea to workers who have linked to her. Note, that in one example, she does not know the identities of workers who have linked to her, and, in another example, she may be able to view the identities of workers who have linked to her and recruit these workers selectively. If the invited workers find the idea valuable, as indicated by their voting and posting activity, the recruiting worker will receive wisdom for a useful recommendation, depending on how the administrator has set worksite rules. Similarly, if the invited workers do not respond to the invitation, the inviting worker may lose wisdom. This feature will allow for efficient team building but require workers to carefully weigh the value of ideas they are recommending.

To facilitate team-building, in some embodiments of the present invention, the administrator can initialize links between workers to create personal networks of workers, which would be helpful in breaking the ice between workers and facilitating new relationships in the system. For example, these links may be initialized with the specific purpose of increasing communications across functional groups of employees, or geographical regions of employees, participating in the worksite. Also, these links may be randomly generated for the same or similar purposes, much as a facilitator for a team-building workshop would invite participants to count off into teams of four. In one example, workers will then be able to selectively add and remove links during use of the system to customize their personal network from the state initialized by the administrator.

Figure 10:
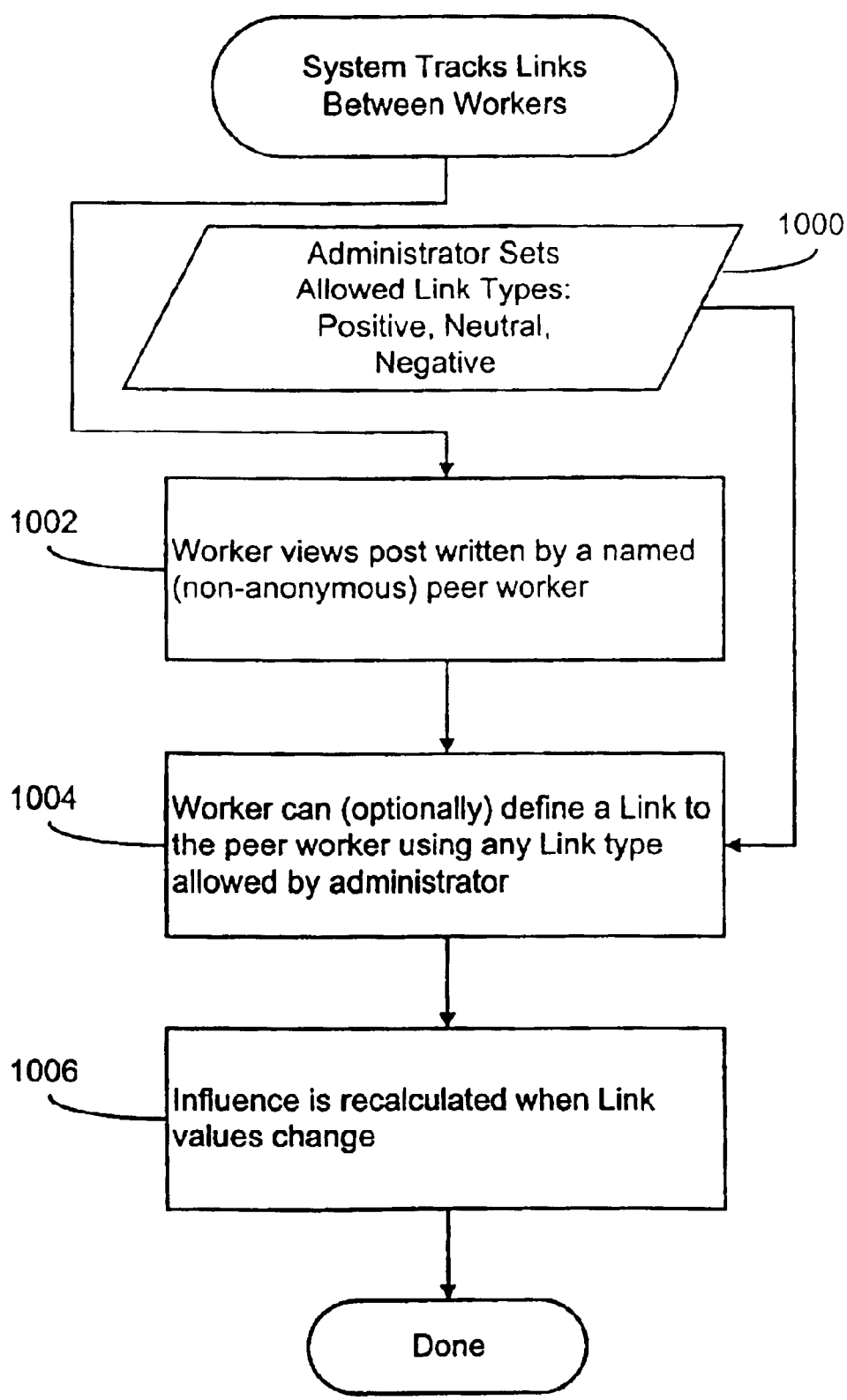
FIG. 10 is a flowchart illustrating the operations involved in tracking links between workers according to one embodiment of the present invention.

Referring to FIG. 10, a method for tracking links between workers is illustrated according to aspects of the present invention. In operation 1000, the administrator sets allowed link types. As discussed above with regard to operation 406 of FIG. 4, the administrator may set any combination of positive, neutral, and negative link types. In operation 1002, a worker views a post written by another worker.

In operation 1004, the worker may optionally choose to link to the other worker. Depending on how the administrator configured the worksite in operation 1000, the worker may choose to create a "positive," a "negative," or a "neutral" link depending on their opinion of the post, and accordingly their opinion of the author of the post. If the worker feels that the post is particularly insightful or of otherwise high quality, then the worker may choose to create a positive link. If the opposite is true, then the worker may choose to create a negative link. Influence is typically a function of links; depending on worksite rules; accordingly, in operation 1006, each time a worker links to another worker, influence of all workers in the worksite is recalculated as discussed below with regard to FIG. 12.

Referring again to FIG. 2, in operation 204, workers may collaborate by recommending outcome for an idea. In operation 212, work on the idea is concluded. The view an idea page also includes a recommendation section 78 (e.g., recommendation module 20) for the worker to provide their recommendation about what should happen to the idea. In one example, the worker recommends summarization of the idea, or recommends abandonment of the idea, or the worker can indicate that she has yet to draw a conclusion about the idea. When the time to close the idea comes, the administrator may use the recommendations provided by the workers along with other factors to determine whether to summarize the idea, abandon the idea, or leave the idea open for further comment. In one example, the administrator may choose to abandon an idea if it has a low volume of activity, indicating low worker interest, or seems to have no clear consensus or direction as is the case when workers are not directly commenting on each other's work. Alternatively, the administrator may typically choose to summarize an idea if it has a high volume of discussion, indicating high worker interest, and where workers are obviously interacting and improving upon each other's suggestions. Even if such a summarized idea will never be implemented, it can provide valuable insights to executives or other appropriate decision-making bodies. A worker earns wisdom 26 if their recommendation for an idea corresponds with the administrator's subsequent actions.

Alternatively, the recommendation section may also include a further funding button for a worker to recommend that an idea receive some additional merit points. Accordingly, the administrator, in addition to summarization or abandonment, can fund an idea or recommend funding for an idea. Further funding for an idea allows for further work on an idea, and can also encourage more work, and higher level workers to work on the idea.

Besides the administrator summarizing, abandoning, or funding an idea, the system may be configured to automatically perform these functions based on worker recommendation. In one example, the idea is automatically summarized, abandoned, or funded, depending on whether more worker recommended summarization, abandonment, or funding, respectively. In regard to automatic funding, the administrator typically determines the amount of merit points to allocate to the idea if the majority of workers select further funding.

In another embodiment of the present invention, summarization and abandonment are supplemented with stage gates. The systems according to the present invention are intended to function as a collaborative idea refinery, where workers suggest many possibilities at an early stage of development and then collaborate to scrutinize and improve certain of the ideas, with relatively few such ideas surviving the entire process to be implemented by the company. As such, systems according to the present invention will offer an extended and customizable series of stage gates, where at each point ideas can advance to the next stage or be abandoned.

In one example, a set of progressive stage gates through which ideas may advance, unless they are abandoned, include: "open", "summarized", "reviewed", "sponsored", and "implemented". Open indicates that an open discussion is occurring; summarized indicates that the open discussion has been summarized to its essential concepts; reviewed indicates that an executive or decision-making body, which may also include the workers themselves, have reviewed and analyzed the summary; sponsored indicates that there is now a person in the company who owns further progress on the idea, to whom communication can be directed; implemented indicates that the idea or opportunity emerging from the process of the system according to the present invention has been well-defined and will be executed and implemented by the company. Typically, at this point, a company will rely on its traditional tools and processes to implement the idea.

Stage gates may be customized on a per-worksite basis to reflect the actual processes of the organization or a department within the organization. For example, one customer may decide that their desired process after the summarized stage gate is called a "Cost-Benefit Analysis," which involves certain workers from Finance and Marketing completing a defined survey about the expenses and possible value associated with the summarized idea. Systems according to the present invention provide a customizable platform where stage gates may be renamed to suit the purpose of a specific worksite and where new work modules may be defined to support the work at that stage gate. Typically, the work defined in these new work modules will translate back to the worker credentials and worksite rules. In one hypothetical example, a work module that is a survey may be defined such that a worker completing the survey earns a pre-defined amount of merit or, additionally, that the worker gains wisdom by providing responses that are close to the mean value of responses for the survey.

With regard to the summarized stage gate, the work at that stage gate involves extracting the essential concepts and meaning from the open discussion that occurred previously, during the open stage gate. Summarizing a transcript of text, in general, is complex work that almost certainly requires some level of human involvement, from an editor, for example. However, many software vendors have developed algorithms that perform semantic analysis on text to extract central concepts by looking at the frequency and proximity of certain keywords, grammar, and the like. These central concepts can form the skeleton or outline of a summary, directing the attention of the human editor to the concepts and detailed text pertaining to the concepts. A message board and its threaded discussion structure has the advantage of adding meaning to otherwise unstructured text. For example, by finding a deep posting thread that alternates posts between two authors, a conceptual analysis algorithm can infer (perhaps correctly or incorrectly) that this is a heated debate between two people.

Native to the idea discussion message board format in systems pertaining to the present invention are certain attributes not commonly found in other message boards which can facilitate an algorithmic conceptual analysis: count of votes, post credit, agreement or disagreement, named or anonymous posters. These can be combined with commonplace message board attributes, such as thread depth, date of post, and author of post, and semantic analysis techniques, to extract concepts. In one hypothetical example, a deep thread, with a high post credit, with many different authors, each posting anonymously, with strong agreement, with keywords "Project X" and "failure" may cause a conceptual analysis algorithm to infer that employees believe Project X is doomed to failure, but they're afraid to say so to management. Such an inference can direct the attention of an editor, the workers, or anyone else who is engaged to summarize that discussion. In one example, systems pertaining to the present invention can publish headline concepts to executives, workers, and others, that contain headlines of current worker activity as conceptually analyzed by algorithms.

Figure 11:
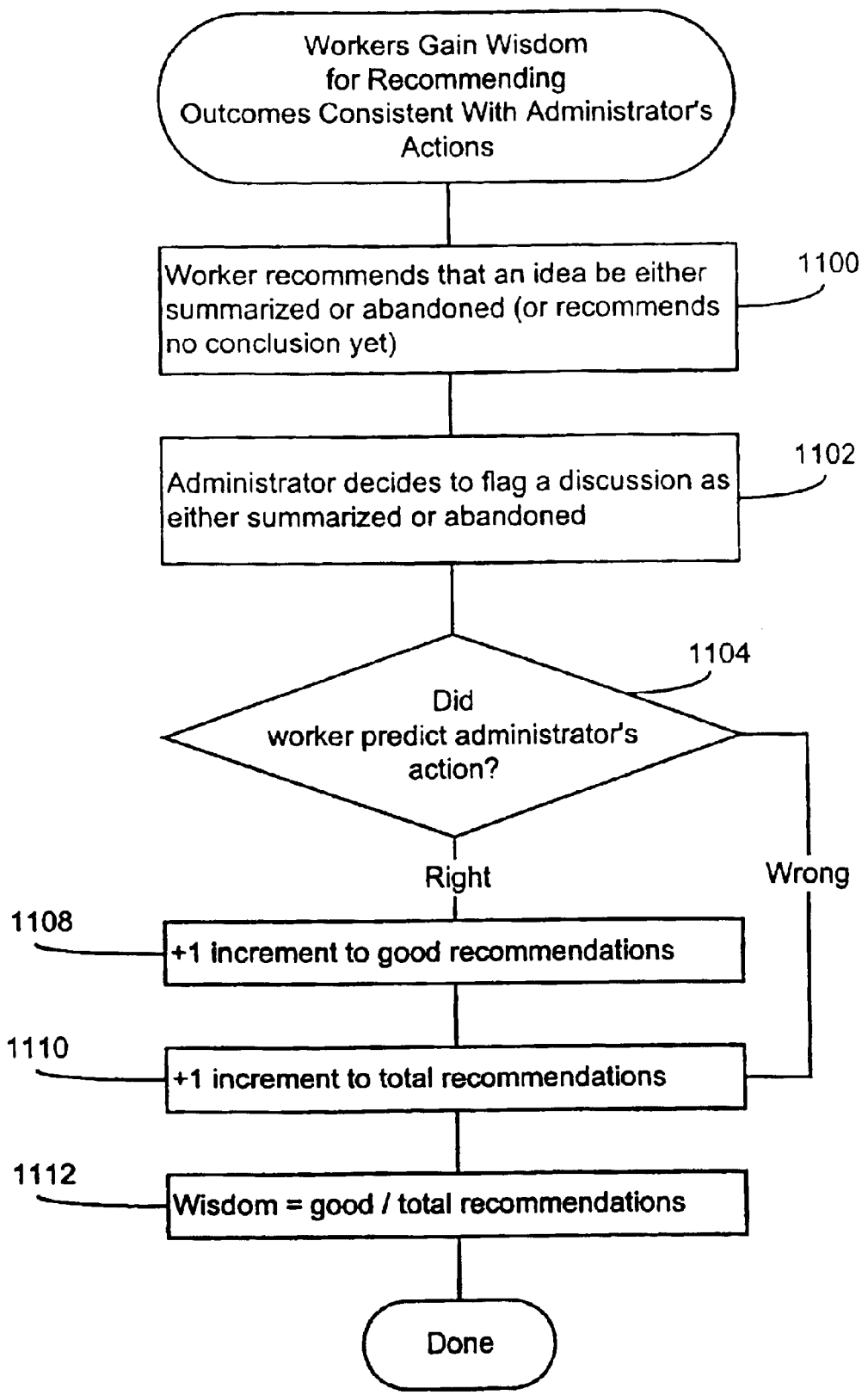
FIG. 11 is a flowchart illustrating the operations involved in determining a worker's wisdom according to one embodiment of the present invention.

Referring to FIG. 11, one method for determining a worker's wisdom 26 is shown according to aspects of the present invention. In operation 1100, a worker recommends an outcome for the idea including summarization, abandonment, or no conclusion yet. In operation 1102, the discussion about an idea is concluded, and the administrator 10 summarizes or abandons the idea, in one example. In operation 1104, it is determined whether the worker recommended a conclusion to the idea consistent with the administrator's ultimate conclusion.

In operation 1108, only a worker whose conclusion was consistent with the administrator's conclusion receives a +1 increment to a good recommendations value, which is used in the worker's wisdom calculation. In operation 1110, all workers then have a +1 increment to a total recommendations value for the idea, which is used in each worker's wisdom determination. This is a calculation similar to a baseball batting average. An obvious limit of this calculation is that a worker with one correct recommendation has a perfect average of 1.000, and the worker has no incentive to make subsequent recommendations, because the wisdom score can only decrease. In one example, a worksite rule can be configured such that after a discussion receives a certain threshold of posts, such as 10 posts, workers are required to make a recommendation before they are permitted to post or vote additionally on the idea. In another example, the wisdom calculation can be modified such that workers who post or vote on an idea but do not make a recommendation about the outcome are slightly penalized for not having an opinion when the idea is abandoned or summarized by the administrator.

In operation 1112, each worker's wisdom is determined. In one example, the worker's wisdom is determined by dividing the good recommendation value (1108) by the total recommendation value. For example, if the worker has previously made three recommendations subsequently followed by the administrator and one recommendation subsequently not followed by the administrator, the worker's current wisdom is 0.75. If in operation 1112, the next recommendation by the worker is followed by the administrator, then the worker has made four correct recommendations out of a total of five recommendations on idea outcomes for a new wisdom of 0.8.

In one example, if an idea is to be summarized, a task (see below) is created and the administrator 10 can elect either to have the highest credentialed worker in the idea summarize it or open the task up for bidding from the workforce in general. Alternatively, the administrator may summarize the idea. Summarization, in one example, includes a written summary of all of the discussion about the idea, the total number of workers that worked on the idea, the number of posts, the number of votes, the merit allocated to the idea, the subject line of the idea, the time that the idea was open for work, and the worksite that the idea was in. Once summarized, the idea will have the summary added to it as an overlay to the original discussion and placed in a summarized stage gate accessible from the summarized link on the ideas page. Workers can still view the discussion and read the summary by selecting the idea from the summarized list, but they can no longer vote or post to the discussion.

Figure 12:
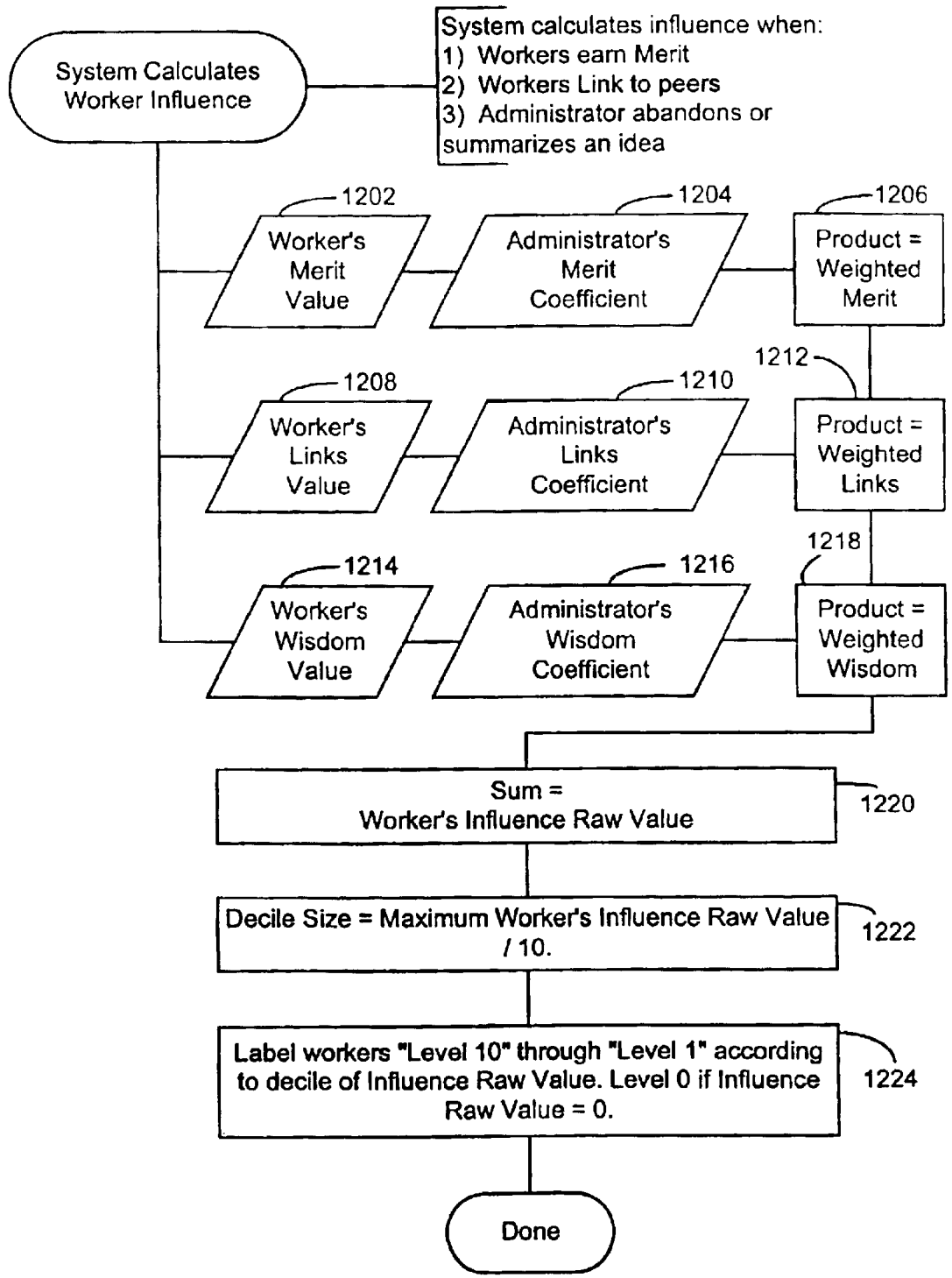
FIG. 12 is a flowchart illustrating the operations involved in determining a worker's influence according to one embodiment of the present invention.

Referring again to FIG. 2, in operation 214, a worker's influence 28 is determined. Referring to FIG. 12, a flowchart illustrating the operations involved in determining a worker's influence value are shown, in one example. In general, the system calculates a workers influence 28 when workers earn merit 22, when workers link 24 to other workers, and when the administrator summarizes or abandons an idea, at which time workers stand to gain or lose wisdom 26. Referring to FIG. 13, a workers page is shown illustrating seven hypothetical workers participating in the worksite illustrated in FIG. 3. In one example, hypothetical worker Cameron W. has a merit value of 250 points, a links value of 5.6, and a wisdom value of 0.8.

In operation 1206 of FIG. 12, a weighted merit value is calculated for Cameron W. by multiplying the worker's merit value 1202 (e.g., 250) by the merit coefficient 1204 (e.g., 0.1) for the worksite. Accordingly, the weighted merit value for Cameron W. is (250)(0.1)=25. In this example, setting the merit coefficient at 0.1 decreases the effect of merit on the influence determination, which appropriately scales the weighted merit value relative to the weighted links and wisdom values as desired by the administrator. For example, if a community of workers has been active in the system for a year or more, some of the workers may have thousands of merit points. In this case, a wisdom value ranging from +1.0 to −1.0 would have a negligible impact when added to merit for an influence calculation. To increase the relative impact of wisdom, the merit coefficient could be set as 0.01. In one embodiment, weighting coefficients for merit 22, links 24, and wisdom 26 follow a curve such that workers with hundreds of merit points have a merit coefficient of 0.1, and workers with thousands of merit points have a weighting coefficient of 0.001, for example.

In operation 1212, a weighted links value is calculated for Cameron W. by multiplying the worker's links value 1208 (e.g., 5.6) by the links coefficient 1210 (e.g., 1) for the worksite. Accordingly, the weighted link value for Cameron Warning is (5.6)(1)=5.6.

In operation 1218, a weighted wisdom value is calculated for Cameron W. by multiplying the worker's wisdom value 1214 (e.g., 0.8) by the wisdom coefficient 1216 (e.g., 10) for the worksite. Accordingly, the weighted wisdom value for Cameron W. is (0.8)(10)=8. In this example, setting the wisdom coefficient at 10 increases the effect of wisdom on influence.

In operation 1220, a raw influence value for the worker is determined by adding the weighted merit value, the weighted links value and the weighted wisdom value. Accordingly, the raw influence value for Cameron W. is 25+5.6+8=38.6. As discussed above, the coefficients can dramatically affect the raw influence value. For example, with the merit coefficient set at 0.1, merit has a weighted value of 25, which is about 64.8% of the raw influence value of 38.6. If, for example all three of merit, links, and wisdom had weighting coefficients of 1 (or were unweighted), then an unweighted merit value of 250 would be about 97.5% of the raw influence value of 256.4. Thus, changing the coefficients can have a dramatic effect on the raw influence value, and the effect that any one particular credential has on the raw influence value.

In operation 1222, the worker with the maximum raw influence value is found and that value is divided by 10 to create the decile size. For example, if Cameron W. is found to have the maximum raw influence value of all workers at 38.6, then the decile size is 3.86. In operation 1224, a label of Level 0 through Level 10 is assigned to each worker, based on the decile the worker currently occupies. For example, if another worker has a raw influence value of 21.0, then the worker's decile is calculated as 21.0/3.86= 5.44, which is then truncated as "5" and displayed as "Level 5".

Each worker 2 within a worksite 6, or generally within the system, has a unique worker identification (worker ID). In one example, workers choose their own worker ID. Alternatively, the administrator 10 can assign worker IDs, or they can be randomly generated. For administrator assigned IDs, the worker might use the same worker ID as their e-mail name, their employee number, or the like, in one example. In the enterprise environment (discussed below with reference to FIG. 15), worker IDs are associated with a particular customer, e.g., a particular company, or with a particular worksite for the customer. Whereas, in the open use environment (FIG. 17), worker IDs are associated with the system generally.

In addition to the worker ID, in some embodiments of the present invention, each worker submits an initial worker profile. The worker profile is updated as the worker works on ideas, and accordingly gains merit, influence, wisdom, and the like. In one example, the initial worker profile includes the workers first and last name, email address, nickname, user ID, password, password recovery hint, address, and resume information. In the Internet embodiment, additional initial worker profile information is provided including the company where the worker works, department name, address, phone number (home and business), mobile phone number, fax number, pager number, a personal photo, the worker's career status (e.g., contractor, temporary, retired, military, etc.), the worker's industry or profession (e.g., accounting, information technology, law, engineering, etc.), resume information (e.g., current and past employers, education, etc.), any affiliations, and particular skills. In some embodiments of the invention, the worker can choose to keep some or all of the fields private, with the exception of the worker ID, while in other embodiments the fields may be required.

In one embodiment of the present invention, a worker may have their real-world credentials verified (i.e., their work history, their education, etc.). Workers with verified credentials will be differentiated from other workers, such as through visual differentiation through colors, font, and the like. Verified credentials is particularly useful in the free agent systems, such as is illustrated in FIG. 4 (discussed below). By having verified credentials, the worker may facilitate more links, and thereby earn more merit, and obtain greater influence.

Referring again to FIG. 13, a "workers" page 92 is shown, which illustrates the worker credentials for an exemplary set of workers in the worksite. The workers page shows merit 94, links 96, wisdom 98 and influence 100 credentials for each worker, and workers are sorted in order of highest influence. The highest influence workers do not necessarily earn the most merit but have the best combination of merit, links, and wisdom according to how the administrator configured the worksite rules. The decile ranking (e.g., "Level 8") illustrates where the worker stands in the system relative to other workers. In one example, the decile rankings range from level 0 to level 10, with level 10 being the highest ranking in the system and being defined by the maximum raw influence value of any worker in the system as discussed with reference to FIG. 12. By clicking on or otherwise selecting a worker's user name, e.g., "LupeZ," the worker's profile information is displayed thereby allowing workers to assess the skills, interests, and other published profile information of other workers in the worksite.

Referring again to FIG. 2, in operation 210, the administrator issues one or more merit payments to workers. Payment or merit is stored in a worker account in the system and may be redeemed by the worker for cash or other forms of compensation as defined by the worksite rules. In one example, a minimum amount of merit must be stored in the worker's account to be redeemable. As discussed below, merit may be configured to "evaporate" over time. Merit may be classified as redeemed merit or available merit. Redeemed merit shows what portion of a worker's earned merit he has cashed our or redeemed for other forms of compensation. Available merit is the earned merit less any redeemed merit. In some embodiments, workers are allowed by the worksite administrator to self-fund ideas with their own available merit.

Figure 14:
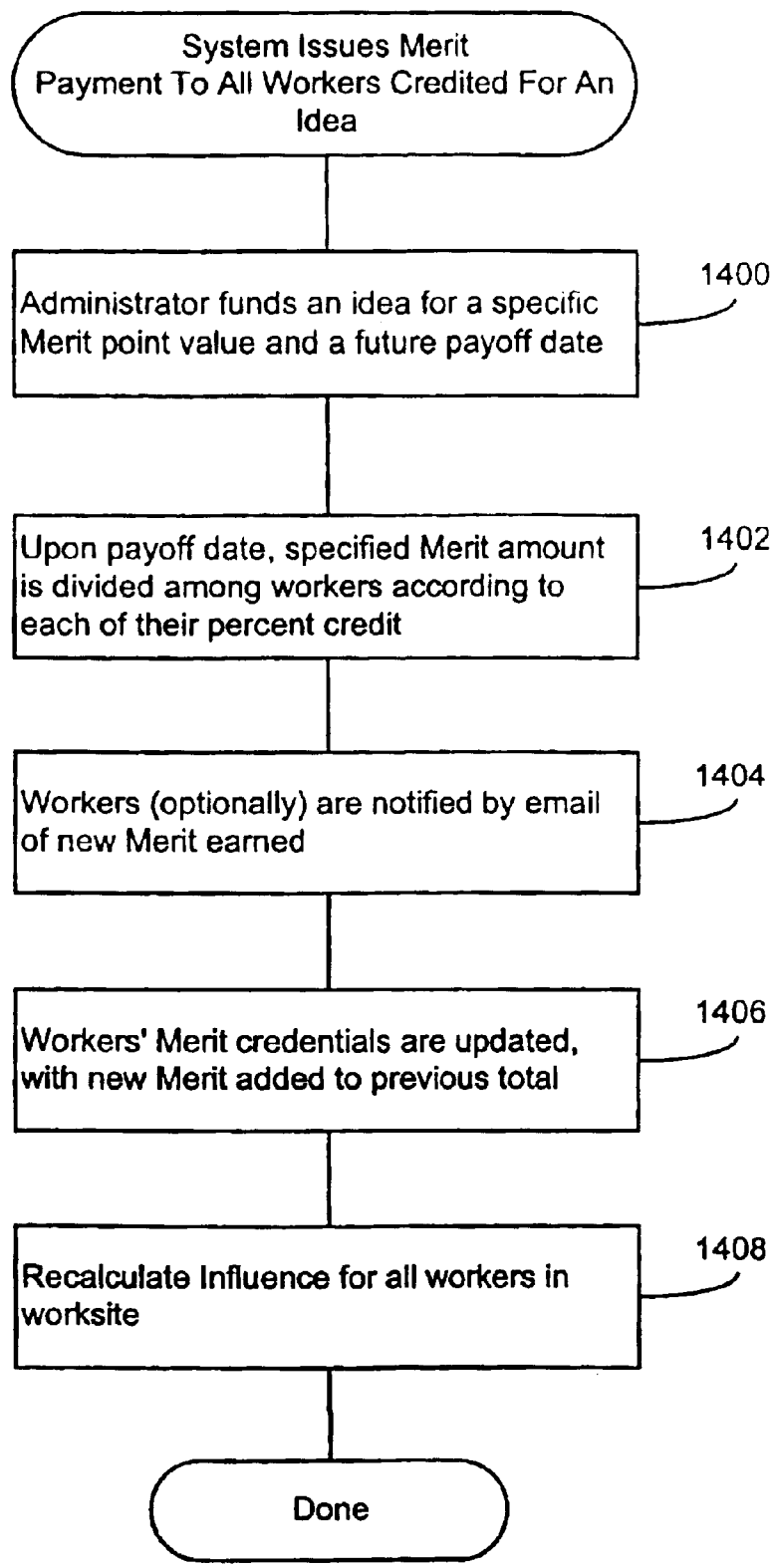
FIG. 14 is a flowchart illustrating the operations involved in issuing merit payment to workers.

Referring now to FIG. 14, one method for determining a worker's merit 22 is illustrated according to aspects of the present invention. In embodiments of the present invention, the system allocates merit points to all workers credited for an idea when a merit payoff to the idea occurs. In operation 1400, the administrator funds an idea for a specific merit point value, and sets a future payoff date. As discussed above, workers and other participants may also fund an idea, and some ideas are not initially funded, if at all.

In operation 1402, when the payoff date occurs, then the specified merit amount is divided among workers according to each worker's percent credit, which in one example is determined according to the method illustrated in FIG. 9. Referring to the example discussed with reference to FIG. 9, if a worker credit for an idea such as the SMT idea is 22.82%, and 1000 merit points are paid to the idea, then the worker receives 228.2 merit points.

In operation 1404, each worker receiving merit points from a new merit payoff may be notified via e-mail. Alternatively, the worker may be required to visit the worker page to determine their merit, which encourages use of the system.

In operation 1406, each worker's merit credential is updated, with the new merit determined in operation 1402 being added to the worker's previous merit. In operation 1408, all workers influence credentials are recalculated according to the method illustrated in FIG. 12 to reflect the change in merit for some workers.

In embodiments of the present invention, the worker credentials may be configured to "evaporate" or otherwise degrade over a time if the worker fails to remain active in the system. For example, independent of merit redeemed for cash or other compensation, the worksite rules can be configured such that the value of the merit credential is halved after every six month period without activity. Links can be configured to disappear if the linking worker is inactive for a period of time, such as 60 days. Likewise, wisdom can be configured to evaporate if a worker is inactive for some period of time. As influence is a function of merit, links, and wisdom, it also will degrade if any of the worker's credentials degrade.

Alternatively, in one example, a worker credential called "Persistence" is added to the influence calculation account for evaporation of influence over time. In this example, a worker could earn +1 Persistence for each transaction (a post, vote, recommendation or otherwise) on a unique date and −1 for each date during which no transaction occurred, added to a running total value. Such a worker credential helps differentiate a consistently active worker from a worker who was successful six month ago but not since.

Including evaporation rates for links will allow the administrator to increase the influence of workers having recent interactions with other workers. For example, a positive relationship with a worker two weeks ago would matter more than a negative relationship with a worker six months ago. Similarly, including evaporation rates for merit will allow the administrator to increase the influence of workers having recently earned merit. For example, a worker having earned 1,000 points over the last three months would have higher influence than another worker who also earned 1,000 points, but over the last 12 months.

In addition to providing for the evaporation of worker credentials, in embodiments of the present invention ideas may be configured to evaporate over some period of time. Bursts of activity through postings, voting, recommendation, and worker involvement in an idea indicate a community belief in the idea. In the same manner, periods of inactivity can indicate that the community does not value a given idea as highly as other competing ideas. Evaporation of ideas provides less visibility to "inactive" ideas, and accordingly helps to emphasize an active idea. Inactivity, however, may be due to the immediate market needs of a given company due to economic constraints and may not indicate the relative value of the idea. In addition, new ideas generated in other parts of the system may provide the answer for problems facing inactive ideas. Accordingly, if an idea is configured to evaporate, in some embodiments the evaporated idea is still searchable. In one example, on the ideas page an additional "evaporated ideas" link is provided for accessing evaporated ideas.

In some implementations of the present invention, a credential toolkit may be included. This gives an administrator a set of web pages by which she may customize the workings of the worksite rules engine. The relationships and interactions between credentials (such as merit) and work (such as voting or posting) are presented as lists of rules that can be edited, deleted, or added to. In addition, an administrator can create new credentials, which then gain meaning as the administrator creates new rules tying those credentials to work types or existing credentials. (These rules may be presented textually, or visually through the use of drop-down menus, as is well known in the art of visual query design and visual programming.)

For example, an administrator might add a credential called "Cliquishness", and add a rule that increases a worker's Cliquishness credential whenever the worker votes favorably on a post of someone whose other posts have already received favorable votes from them. Then the administrator might adjust rules for calculating influence so as to penalize workers with a high Cliquishness. The ability to create arbitrary new credentials and rules allows administrators to experiment with different community models and also to better match the qualities of the system to their company's own culture.

Figure 15:
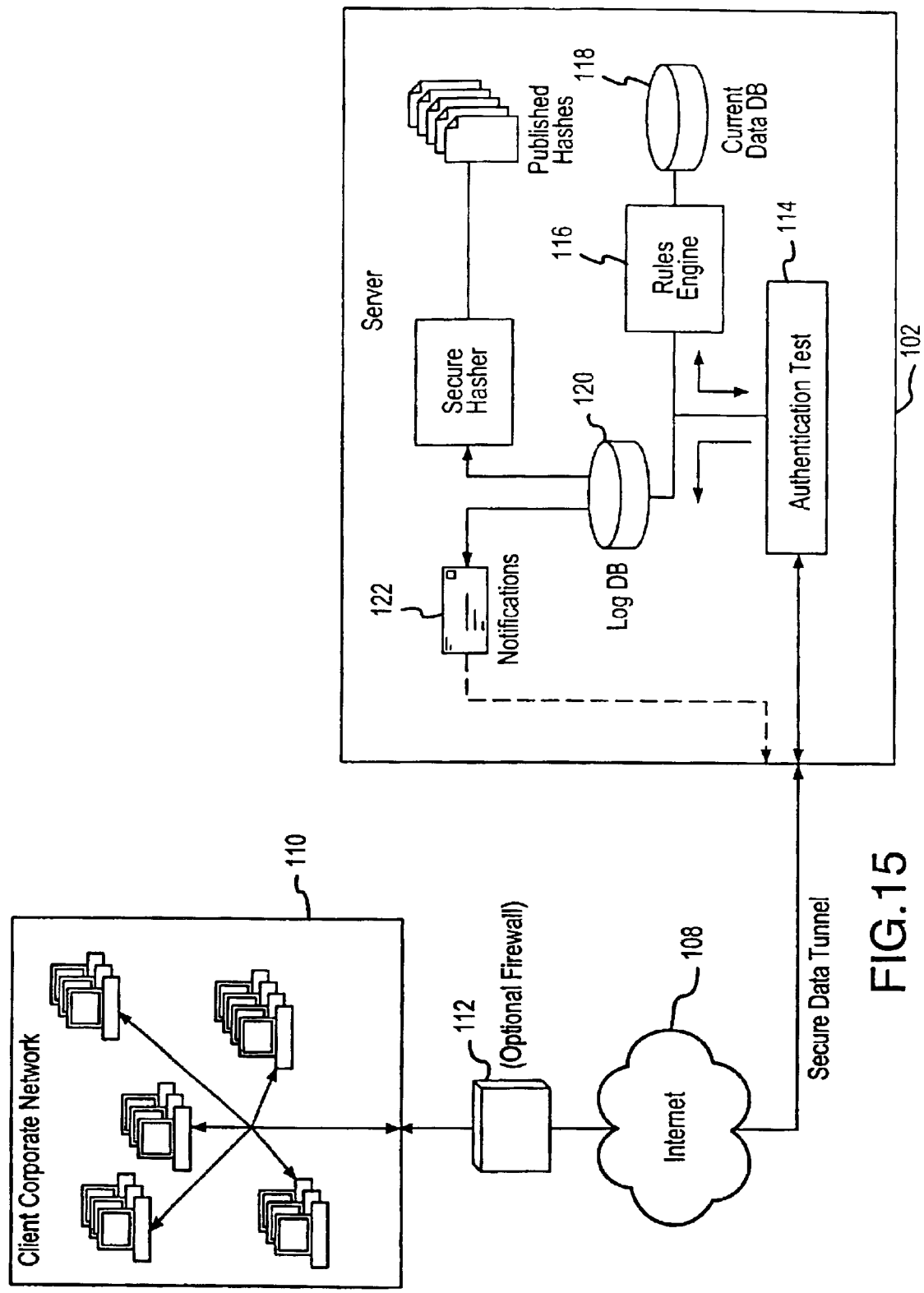
FIG. 15 is a schematic diagram illustrating a server for implementing a system according to the present invention in an enterprise environment.
Figure 16:
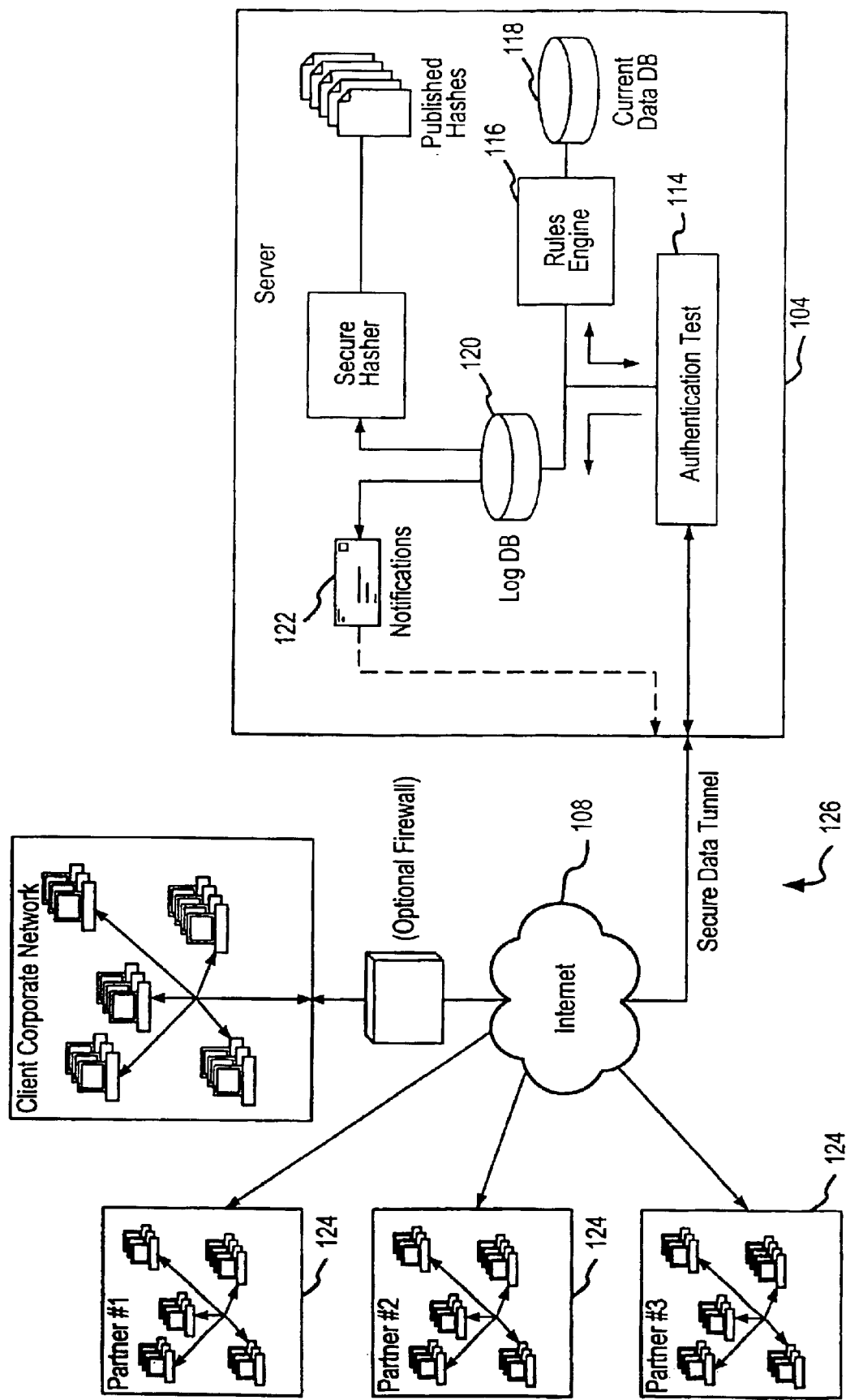
FIG. 16 is a schematic diagram illustrating a server for implementing a system according to the present invention in a private exchange environment.
Figure 17:
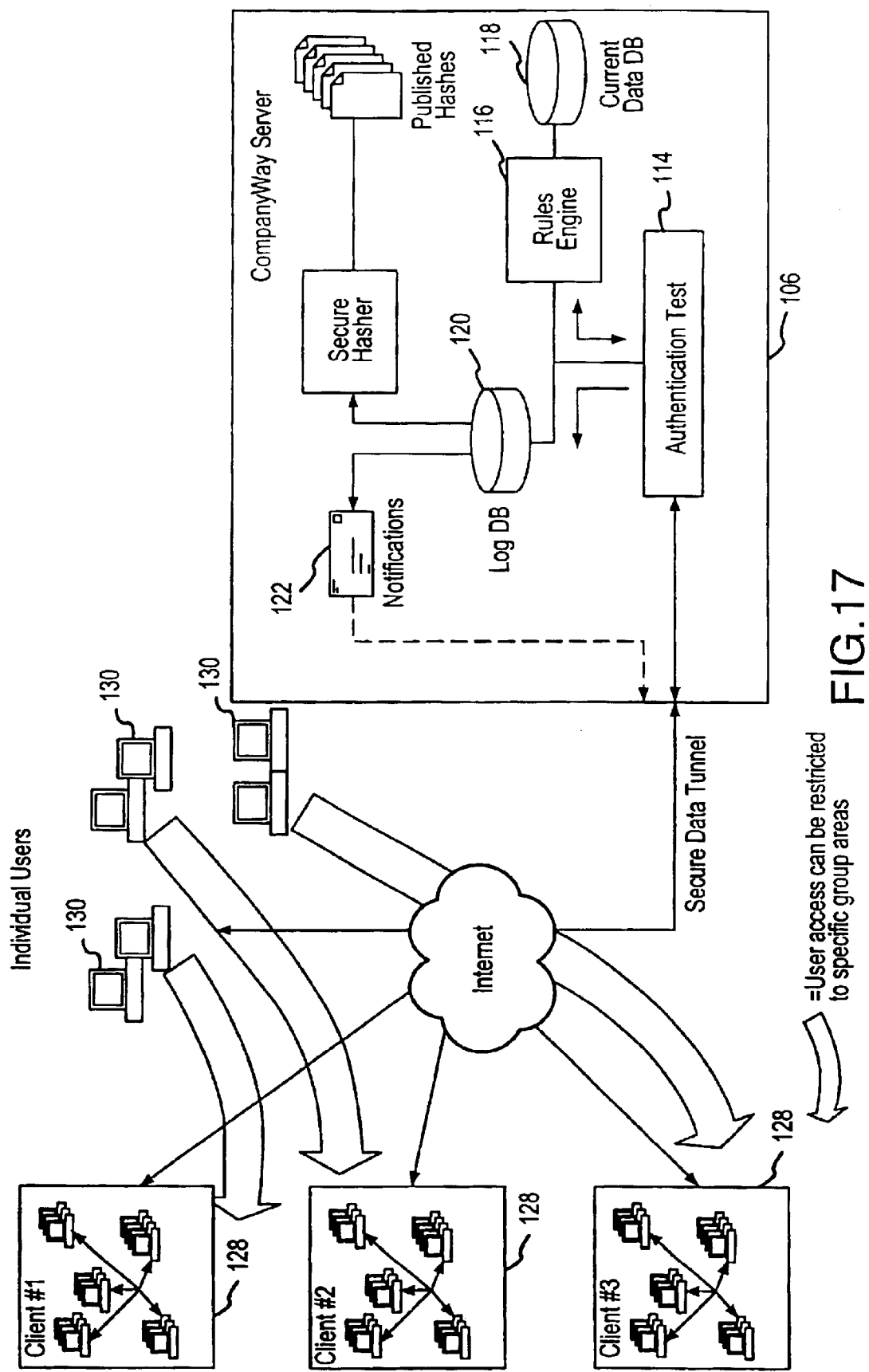
FIG. 17 is a schematic diagram illustrating a server for implementing a system according to the present invention in an open use environment.

FIGS. 15–17 illustrate some of the operating environments envisioned for embodiments of the present invention. FIG. 15 illustrates a server 102 for deploying a system according to the present invention in an enterprise environment. In the enterprise environment, a company or other user of the system can tap into the innovation potential of the company's employees through an alternative corporate structure and culture facilitated by the present invention. FIG. 16 illustrates a server 104 for deploying a system according to the present invention in a private exchange environment. In the private exchange environment, a company or other user of the system can bring together selected employees, vendors, suppliers, and the like, to collaborate on projects. FIG. 17 illustrates a server 106 for deploying a system according to the present invention in an open use environment. In the open use environment, users of the system can tap into an open workforce of free agents.

Referring to FIG. 15, in this example, the server 102 includes program code implementing methods according to the present invention. The server is connected with a network 108, such as the Internet. Users or workers are connected with a corporate intranet 110, which is connected with the system via the Internet. In one alternative, the corporate intranet is connected to the network with a firewall 112 therebetween, which protects the corporate intranet from intrusion from hackers and the like. Employees of the corporation access the company intranet to work on the system with terminals, personal computers, personal data assistants, and other network enabled processing equipment that is well known in the art.

The server system 102 is composed of a number of software components, which run together on a computer, or on multiple computers simultaneously, as is well known in the art, in order to improve reliability or performance. The server system makes use of industry standard web server, database, and email server programs. The present invention's unique capabilities come from programming code, scripts, and the like implementing the system and methods described herein, that run on top of this base system.

When the web server receives any request from a user, it passes control to an authentication module 114, which uses standard Web authentication techniques (for example, session cookies) to ensure that the request is from an authorized user. Then the authenticated request is passed on to a rules engine 116, which is the collection of code that actually processes all user requests, including postings, voting, data retrieval, etc. The rules engine 116 retrieves data from, and stores new data to, the database system 118. In addition, the rules engine 116 records all user activity in a separate log database 126, to provide audit trails.

When an event or activity is logged, a notification module 122 is activated. Users who have previously "subscribed" to various classes of events (such as new posts being added to an idea) can then be sent a notification of the event by the notification module. This notification would typically be an email message. In some configurations, notifications could be sent as a call to a pager, a telephone call with synthesized speech, or the posting of a message into some messaging system external to the present invention (such as a message queuing system, as is well known in the art of application integration).

In the enterprise environment, each company or organization has a unique account, and each employee of the company working in the system are associated with the account. In one embodiment, the workers will access the company's worksites by entering a unique URL into their web browser, which is set-up for the company. The worker will enter the worksites by entering a user ID and password, which are set up when the worker first enters the systems as discussed below.

Referring to FIG. 16, in this example, the server 104 includes program code implementing methods according to the present invention, and the server is connected with a network 108, such as the Internet. One or more partners 124 (e.g., vendors, suppliers, research institutions, independent contractors, etc.) are also connected to the Internet and thereby have access to the server. Accordingly, the corporation and its partners may collaborate on ideas in a private exchange environment 126.

Referring to FIG. 17, the server 106 includes program code implementing methods according to the present invention. In this example, clients 128, such as corporations and the like, that are connected with the Internet access the system and define ideas in the system. Workers 130 who are also connected with the Internet, access the system and participate in or work on ideas in the system. The workers are not formally affiliated with the clients, e.g., they are not employees. Rather the workers are free agents who collectively form an open workforce. In the open workforce environment, the present invention provides a platform for free workers and clients to collaborate. In the open workforce environment, a particular corporate customer can designate competitors, and prevent workers from working in a competitor's worksite. For example, company A can designate company B as a competitor so that free agent workers that join the company A worksites will be banned from joining the company B worksites.

Alternative configurations of the present invention are envisioned. For example, software code embodying aspects of the present invention may reside on a server that is directly connected with the corporate intranet, or reside individually on each of the processing units functioning in a distributed manner. The present invention can also be embodied as computer readable code on a computer readable medium. The computer readable medium being any storage device that can store data which can thereafter be read by a computer system. Examples of the computer readable medium include a read only memory, a random access memory, a storage area networks, a memory stick, magnetic data storage devices such as diskettes, and optical storage devices such as CD-ROMS. The computer readable medium can also be distributed over a network coupled computer system so that the computer readable code is stored and executed in a distributed fashion. The computer readable code may also be distributed using a propagated signal receivable by the computer system and executable therein.

The computer readable code may be written in any suitable programming language, and for any suitable computing platform. Some implementations of the present invention may be compiled into a platform-independent format, such as Java byte codes, or other formats that can be generated by standard development tools as are well known in the art.

In addition to ideas, a worker, administrator, or other user, may define a task. As used herein a "task" defines work necessary to further an idea that a worker cannot perform exclusively within an embodiment of the present invention. Examples of tasks include research, testing, sales and marketing processes, branding, etc. To illustrate the difference between a task and an idea, the idea might include a structured discussion about the unique properties and benefits of a new product, whereas the task related to the idea might be a document specification for the new product.

For worker initiated tasks, a worker identifies a particular task that needs to be performed in order to focus or otherwise supplement an idea. In one example, the initiating worker may allocate a specific number of her points to the task, such that the worker who successfully completes the task will receive a transfer of points from the initiating worker. The incentive for the initiating worker to self-fund the task is that she would receive both credit from the post creating the task as well as the post with the completed task. Workers will be incented to self-fund tasks any time they predict that the credit to be allocated to the tasks through these two posts will exceed the cost of the task.

For administrator initiated tasks, the administrator can elect to create a task that he believes is necessary to furthering an idea or product. The administrator would specify the parameters of the task and the payout associated with the successful completion of the task. In the event that the company sponsoring a worksite has invited third-party participants into a private worksite, the administrator may break the tasks up into discrete units that protect any confidential interests of the company.

Whenever a task is created, whether by a worker or the administrator, each task will appear in a sorted listing of all tasks available at any time on the system. This listing will allow some workers the choice of working on tasks for pre-specified payouts of points rather than work on speculative or contingent strategy discussions associated with an idea.

Tasks will be listed by criteria that allow a worker to match her interests and abilities with the available tasks. At the option of the administrator, workers may be allowed to see only those tasks that meet their "real world" or system credentials.

Another use of the present invention is to facilitate opportunity mapping, which is a structured discussion among workers about things that may be possible for a business to do, the market opportunities of the possibility, the benefits of the possibility, the challenges of the possibility, etc. Oftentimes, opportunity mapping is associated with a stakeholder who is associated with the opportunity, such as a customer, a producer, a distributor, or a value-added provider, and the opportunity is a product, a service, or process. In opportunity mapping, a variety of opportunity nodes are defined including idea nodes, benefit nodes, request nodes, challenge nodes, and error nodes. In opportunity mapping, workers classify the nodes using classification buttons similar to those described with reference to FIGS. 8A and 8B, and other workers judge the content of the nodes as with other uses of the system discussed herein.

The idea node is one type of opportunity node that describes something that is or may be feasible, something that is or may be possible to do, to make, to provide, etc. An idea node, unlike other opportunity mapping nodes, may initially stand alone and be created using the create new idea functions discussed above, or may be associated with other opportunity nodes. The idea node at the beginning of the opportunity map is considered the root opportunity as described above.

The benefit node is one type of opportunity mapping node that describes the desirable or potentially desirable properties of the opportunity root idea node or other idea nodes. Generally, the desirable property identified by the benefit node may be from the perspective of any stakeholder associated with the idea. The benefit node, unlike the idea node, is not a stand-alone opportunity node, and should be linked to the idea node. In one example, the benefit node may be subclassified by the worker as for the benefit of a particular stakeholder, such as the customer, the producer, or the partner.

The challenge node is a type of opportunity mapping node that calls into question statements made in the idea node or other nodes. For example, designating a post as a challenge node, a worker might question the technical feasibility of the opportunity defined in the idea node, or might question the market appeal of the opportunity defined in the idea node. The challenge node is not a stand-alone node, and is linked with some other type of opportunity node. The challenge presented in the challenge node may be resolved, in one example, by creating an idea node that is linked with the challenge node and solves the problem raised in the challenge node.

The request node is a type of opportunity mapping node for presenting a query for ideas to solve some problem. The request node may be created by workers, or by someone who is not classified as a worker, such as the administrator or an authorized corporate worksite sponsor. The request may be funded such as by allocating merit points, cash, or the like to the request. Funding may be a fixed amount, or may be offered as a reverse-auction bid where workers bid on the request and the requester awards the winning bid.

In one example, workers may fund their own request with accumulated merit points. Upon successful completion of the request, the worker approves the work and a new idea node linked with the request is created and the funding worker receives credit for the new idea node. Typically, workers that fund a request are fairly advanced in that they have substantial accumulated merit, they have numerous links, and a high-level of influence. These workers have naturally become leaders within the system. In effect, by funding a request, the worker is subcontracting out work that the worker recognizes needs completion, but he is not in a position to complete himself.

In one example, the system may be configured to automatically create a link from the requester to the worker that successfully completes the request. Alternatively, if the system is configured so that there is no automatic link, then workers may negotiate and fund a request with both merit and links. Requests may be searched by workers, and may be categorized by industry, worksite, etc., for easier searching.

The error node is a type of opportunity mapping node where a worker may question the accuracy or sincerity of any of the opportunity node types, e.g., idea, benefit, challenge, and request. Any worker can define an error node, which is linked with one of the other opportunity node types. If the error is accepted, then it neutralizes the opportunity that it is linked to, and the linked to opportunity node is not counted as an idea, benefit, etc. Accordingly, the worker that created the neutralized node does not receive any merit when the opportunity mapping associated with the neutralized node is complete. The error node and neutralized node are still viewable by the workers.

In one aspect of the present invention, R&D partners in a private exchange worksite may fund specific portions of the R&D process and offer the corporate sponsor of the worksite a way to spread financial risks.

In one example, a corporate customer may spread the financial risk of the product development process by structuring a very detailed list of tasks in the form of a request for proposal (RFP) or task and seek a third party investor which agrees to fund the task by paying for the points allocated for the successful completion of the task. The investor can be compensated for their point investment in the form of a royalty agreement whereby the investor shares in a portion of the revenue stream for a specified period of time if and when the product comes to market.

Figure 18:
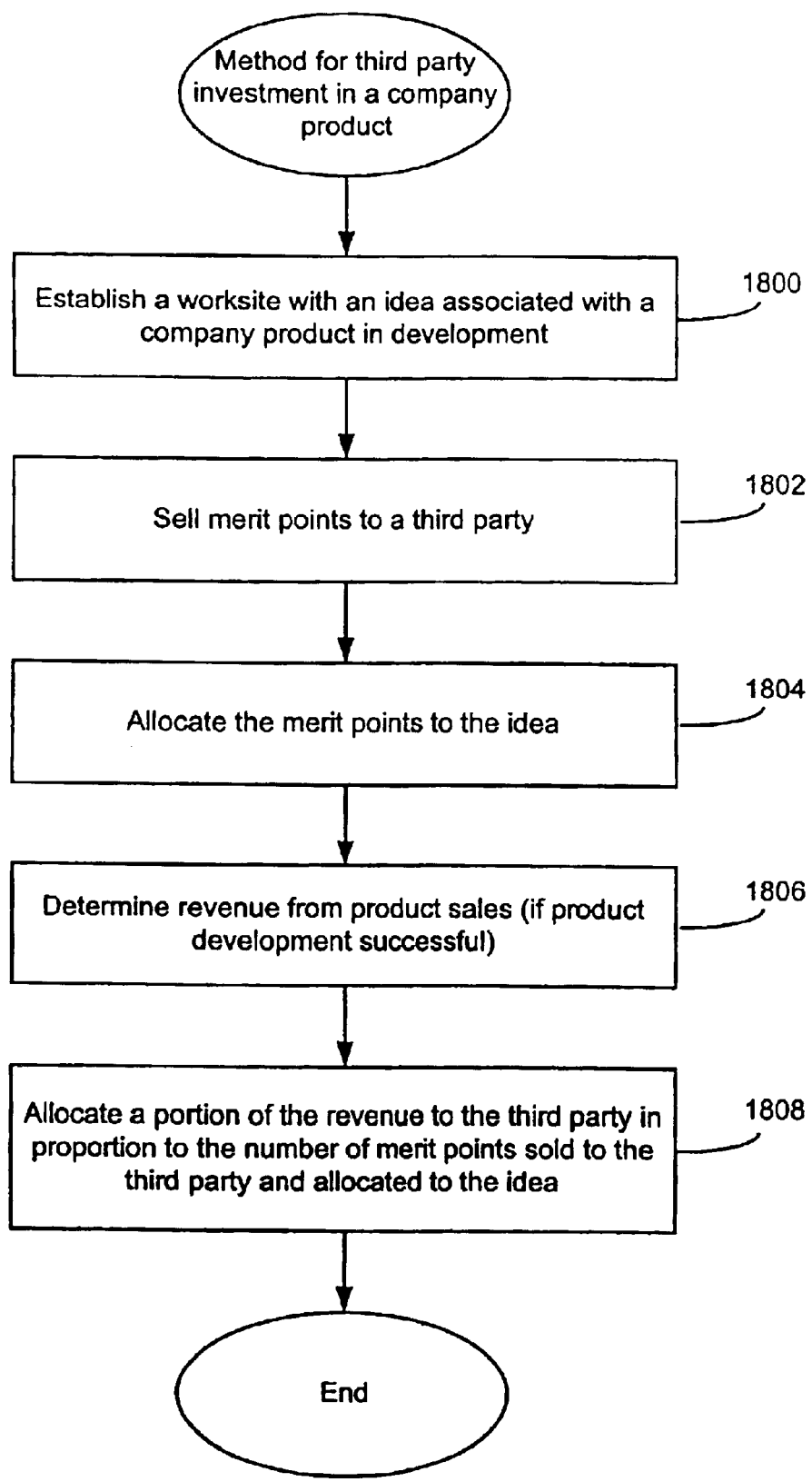
FIG. 18 is a flowchart illustrating a method for third party investment in a company product according to one embodiment of the present invention.

Referring to FIG. 18, one method for facilitating third party investment in a company product according to the present invention is illustrated. In operation 1800, a worksite is established with a defined idea or task associated with a company product in development. In operation 1802, merit points are sold to a third party for some amount. The amount invested in merit points being allocated to the idea. In one example, the idea will represent some discrete phase of product development. In operation 1804, the merit points are allocated to the idea. When the product is complete and sales revenues are generated, then in operation 1806 revenue from the sales is determined. Finally, in operation 1806, the third party investor receives some portion of the revenue likely in proportion to the investment in merit points.

In another example, instead of selling the right to fund one or more specific tasks, a corporate customer could spread financial risk by selling an investor the right to purchase points system, which points would then be allocated by the corporate customer to ideas of interest to it. Similar to the sale of RFPs, the corporate customer and the investor would negotiate the payment the investor is to receive in return for this funding. Because the investor would presumably have less control over how the corporate customer allocates these points, the return on investment would presumably be higher.

In another example, specific transferable interests in royalties ("future fees") from particular products may be created. In this example, a secondary market is established to sell or trade future fees from a particular product to other members in that particular industry or outside investors. Industry insiders may purchase future fees as a hedge against their own business and outside investors may seek to directly participate/speculate in the profits of a particular product.

Once a critical mass of such future fees have been generated, the capital markets may serve as a source of funding by packaging a pool of future fees. For example, a specific venture fund is established which would invest in a pool of ideas from which the corporate customers have assigned a portion of future royalties.

Because this pooling of interests could be non-industry specific, such a vehicle allows investors to participate directly in the potential profits of emerging technologies while minimizing risk through a diversified mix of companies and industries. Furthermore, once a pool of products derived from the present invention successfully generates revenues, owners of such future fees could raise funds at a lower cost of capital through the issuance of investment grade bonds collateralized by such future fees (i.e., securitization).

What is claimed is:

1. A computer network based system for facilitating a self-organizing workforce of one or more workers comprising:
   at least one worksite on the computer network;
   at least one work module on the computer network associated with the at least one worksite, the at least one work module for enabling the one or more workers to work on at least one idea;
   at least one worker module on the computer network associated with the at least one worksite, the at least one worker module for tracking at least one worker credential for the one or more worker;
   wherein the at least one worker credential is a function of the one or more workers' work on the at least one idea;
   wherein the at least one worker credential includes a weighted links credential, a weighted wisdom credential, and a weighted merit credential;
   wherein an influence credential is calculated using the weighted links credential, the weighted wisdom credential, and the weighted merit credential;
   wherein the at least one work module includes a voting module for enabling at least two of the one or more workers to work on the at least one idea by providing a vote on the merits of the at least one idea;
   wherein each of the workers votes are weighted according to the influence credential; and
   determining an outcome of the idea using the influence credential.

2. The system of claim 1 further including at least one idea definition module on the computer network associated with the at least one worksite, the at least one idea definition module for enabling the one or more workers to post the at least one idea to the at least one worksite.

3. The system of claim 1 wherein the at least one work module includes a posting module on the computer network for the one or more workers to work on the at least one idea by providing at least one post discussing some aspect of the at least one idea.

4. The system of claim 3 wherein the posting module further includes at least one descriptor selection for characterizing the at least one post.

5. The system of claim 4 wherein the at least one descriptor selection is selected from an agree selection, a disagree selection, a benefit selection, a challenge selection, an opportunity selection, a fact selection, or a correction selection.

6. The system of claim 3 wherein the posting module includes a message board.

7. The system of claim 3 wherein the at least one work module includes a voting module for the one or more workers to work on the at least one idea or the at least one post by providing a vote on the merits of the at least one idea or the at least one post.

8. The system of claim 7 wherein the voting module includes at least one weighted voting selection.

9. The system of claim 8 wherein the at least one weighted voting selection includes a −1 voting selection, a 0 voting selection, a +1 voting selection, a +2 voting selection, and a +3 voting selection.

10. The system of claim 7 wherein the at least one worker credential includes a merit credential that is a function of the post and the vote.

11. The system of claim 3 wherein the at least one work module includes a recommendation module on the computer network for the one or more workers to work on the at least one idea by providing a recommendation for the outcome of the at least one idea.

12. The system of claim 11 wherein the recommendation module includes a summarization selection, an abandonment selection, and a further funding selection.

13. The system of claim 11 wherein the at least one worker credential includes a wisdom credential that is a function of the recommendation for the outcome of the at least one idea.

14. The system of claim 3 wherein the one or more workers include a first worker and a second worker, the at least one work module includes a linking module for the second worker to establish a link relationship to the first worker.

15. The system of claim 14 wherein the linking module includes a positive link selection, a negative link selection, and a neutral link selection.

16. The system of claim 14 wherein the at least one worker credential includes a link credential that is a function of the link relationship.

17. The system of claim 16 wherein the links credential for the first worker is incremented by 1 when the link relationship is established.

18. The system of claim 1 wherein the at least one worksite is associated with a worksite rules module for defining at least on worksite rule for the at least one worksite.

19. The system of claim 18 wherein the at least one worksite rule includes at least one configurable worker credential coefficient.

20. The system of claim 18 wherein the at least one worksite rule includes a configurable percentage allocation of merit points for work performed in the posting module and a configurable percentage allocation of merit points for work performed in the voting module.

21. The system of claim 18 wherein the at least one worksite rule includes an influence-weighted voting selection for scaling the one or more workers vote as a function of the influence credential, an influence-weighted posting selection for scaling the one or more workers post as a function of the influence credential, and an influence-weighted recommendation selection for scaling the one or more workers recommendation as a function of the influence credential.

22. The system of claim 18 wherein the at least one worksite rule includes a minimum influence for posting selection for setting a minimum influence credential to access the posting module.

23. The system of claim 1 wherein the at least one worksite rule includes a minimum influence for voting selection for setting minimum influence credential to access the voting module.

24. A computer network based method for facilitating a self-organizing workforce of one or more workers comprising:
   providing a worksite on the computer network having a set of worksite rules;
   providing at least one work module on the computer network associated with the worksite for the one or more workers to collaborate on at least one idea,
   associating at least one worker credential with the one or more workers, the at least one worker credential including an influence credential calculated with a weighted links credential, a weighted wisdom credential, and a weighted merit credential;

updating the at least one worker credential for the one or more workers as a function of the collaboration;

wherein the at least one work module includes a recommendation on the computer network module for the one or more workers to collaborate on the at least one idea by providing a recommended outcome for the at least one idea; and determining an outcome for the idea using the influence credential.

25. The method of claim 24 wherein the at least one work module includes a posting module on the computer network for the one or more workers to collaborate on the at least one idea by providing at least one post, and further including the operations of:

receiving the at least one post; and displaying the at least one post in association with the at least one idea.

26. The method of claim 25 wherein the posting module further includes at least one descriptor selection for characterizing the at least one post.

27. The method of claim 26 wherein the at least one descriptor selection is selected from an agree selection, a disagree selection, a benefit selection, a challenge selection, an opportunity selection, a fact selection, or a correction selection.

28. The method of claim 25 wherein the posting module includes a message board.

29. The method of claim 25 wherein the at least one work module includes a voting module on the computer network for the one or more workers to collaborate on the at least one idea by providing a voting selection corresponding with the at least one idea or the at least one post and further including the operations of:

receiving the voting selection; and displaying the voting selection in association with the at least one idea or the at least one post.

30. The method of claim 29 wherein the voting module includes at least on weighted voting selection.

31. The method of claim 30 wherein the at least one weighted voting selection includes a −1 voting selection, a 0 voting selection, a +1 voting selection, a +2 voting selection, and +3 voting selection.

32. The method of claim 29 wherein the at least one worksite rule includes a configurable voting percentage allocation of merit points for the work performed in the voting module.

33. The method of claim 26 wherein the at least one work module includes a recommendation module for the one or more workers to collaborate on the at least one idea by providing a recommended outcome for the at least one idea, and further including the operations of:

receiving the recommended outcome; and displaying the recommended outcome in association with the at least one idea.

34. The method of claim 25 wherein the at least one worksite rule includes a configurable posting percentage allocation of merit points for the work performed in the posting module.

35. The method of claim 24 wherein the recommendation module includes a summarization outcome, an abandonment outcome, and a further funding outcome.

36. The method of claim 35 further including the operation of taking the recommended outcome.

37. The method of claim 24 wherein the at least one work module includes a linking module for one of the one or more workers to collaborate on the at least one idea by establishing a link to another of the one or more workers.

38. The method of claim 37 wherein the linking module includes a positive link selection for establishing a positive link, a negative link selection for establishing a negative link, and a neutral link selection for establishing a neutral link.

39. The method of claim 24 wherein the at least one worksite rule include at least one configurable worker credential coefficient.

40. The method of claim 24 wherein the at least one worksite rule includes an influence-weighted voting selection for scaling the one or more workers vote as a function of the influence credential, an influence-weighted posting selection for scaling the one or more workers post as a function of the influence credential, and an influence-weighted recommendation selection for scaling the one or more workers recommendation as a function of the influence credential.

41. The method of claim 24 wherein the at least one worksite rule includes at least one minimum influence selection for setting a minimum influence to perform work.

42. The method of claim 24 further including the operation of closing the collaboration on the idea.

43. The method of claim 42 wherein the operation of closing includes selecting to summarize the idea or selecting to abandon the idea.

44. The method of claim 24 further including the operation of assigning the at least one idea to one of a plurality of stage gates.

45. The method of claim 44 wherein the plurality of stage gates includes an open stage gate, a summarized stage gate, a reviewed stage gate, a sponsored stage gate, and an implemented stage gate.

46. A computer network based method for a plurality of workers to collaborate on an idea and to receive compensation for the collaboration comprising:

providing a message board on the computer network having at least one idea posted thereon, the at least one idea having an associated number of merit points;

providing a posting module on the computer network for a first worker to provide a post of a discussion about the idea;

providing a voting module on the computer network associated with the post for additional workers to provide a vote on the post;

assigning an influence credential to the first worker and the additional workers, the influence credential calculated using a weighted merit credential, a weighted links credential, and a weighted wisdom credential;

assigning a portion of the associated number of merit points to the first worker as a function of the post and influence credential; and determining an outcome for the posted idea using the influence credential.

47. The method of claim 46 wherein the merit points being associated with a pecuniary interest.

48. The method of claim 46 further including the operation of:

assigning a portion of the associated number of merit points to the first worker as a function of the vote.

49. The method of claim 46 further including the operation of:

providing a linking module on the computer network associated with the post for the additional workers to establish a link with the first worker.

50. The method of claim 46 further including the operation of:

providing a recommendation module on the computer network associated with the post for the additional workers to submit a recommended outcome for the idea.

51. The method of claim 50 further including the operation of:
assigning at least one worker credential to the first worker and the additional workers.

52. The method of claim 51 wherein the at least one worker credential includes a merit credential, a links credential, a wisdom credential, and an influence credential.

53. The method of claim 52 wherein the weighted merit credential is a function of the assigning a portion of the associated number of merit points, the weighted links credential is a function of the link, the weighted wisdom credential is a function of the recommended outcome.

54. The method of claim 50 wherein one or more of the worker credentials are configurable to evaporate.

55. A computer network based system for facilitating the self-organization of a plurality of workers, comprising:
an idea definition module on the computer network for defining an idea;
a rules module on the computer network for specifying worksite rules;
a plurality of respective worker modules on the computer network for the workers, each of the worker modules having a credential parameter and capability of effecting work on the idea, the credential parameter comprising an influence credential calculated using a weighted merit credential, a weighted link credential, and a weighted wisdom credential;
a work module on the computer network responsive to the idea definition module, the rules module, and the worker modules for processing the work of the workers on the idea to enable collaboration amongst the workers in accordance with the worksite rules, and for determining the credential parameters in accordance with work of the workers on the idea and links between the workers; and
the work module further determining an outcome for the idea using the influence credential.

56. The system of claim 55 further comprising:
an additional idea definition module for posting an additional idea, the worker modules further having a capability of effecting work on the additional idea;
an additional rules module for specifying additional worksite rules; and
an additional work module responsive to the additional idea definition module, the additional rules module, and the worker modules for processing the work of the workers on the additional idea to enable collaboration amongst the workers in accordance with the additional worksite rules, and for determining the credential parameters in accordance with work of the workers on the additional idea and additional links between the workers.

57. The system of claim 55 wherein the capability of effecting work in each of the worker modules comprises a capability of vetting, further defining, criticizing, encouraging, focusing, voting, posting, identifying problems with the idea, identifying errors in the idea, describing a benefit with the idea, expressing thoughts in regard the idea, or any combination thereof.

58. The system of claim 55 wherein the credential parameter in each of the worker modules comprises merit, link, wisdom, or influence.

59. The system of claim 55 wherein the worksite rules specified by the rules module comprises rules, incentives, settings, or any combination thereof.

60. A computer network based method for facilitating the self-organization of a plurality of workers, comprising:
establishing rules of collaboration for the workers;
establishing an idea for the workers to work on;
associating worker credentials with the workers, the worker credentials comprising an influence credential calculated using a weighted merit credential, a weighted link credential, and a weighted wisdom credential;
monitoring collaboration of the workers on the idea under the rules of collaboration, each of the workers having an influence on the collaboration;
determining the worker credentials as a function of the collaboration; and
rewarding the workers as a function of the worker credentials.

61. The method of claim 60 further comprising adjusting the influence of each of the workers on the collaboration based on the worker credentials.

62. The method of claim 60, wherein:
the collaboration comprises evaluations by some of the workers of others of the workers; and
the determining step comprises, for a first one of the workers, determining a link credential for the first worker in accordance with evaluations of the first worker by at least some of the other workers, and further comprises, for a second one of the workers, determining a link credential for the second worker in accordance with evaluations of the second worker by at least some of the other workers.

63. The method of claim 60 wherein:
the collaboration comprises distribution of merit points to at least some of the workers; and
the determining step comprises, for a first one of the workers, determining a merit credential for the first worker in accordance with a first assignment of merit points by an administrator, and further comprises, for a second one of the workers, determining a merit credential for the second worker in accordance with a second assignment of merit points by the administrator.

64. The method of claim 60 wherein:
the collaboration comprises recommendations of abandonment or advancement of the idea by at least some of the workers and an action of advancement or abandonment taken by an administrator; and
the determining step comprises, for a first one of the workers, determining a wisdom credential for the first worker in accordance with whether a recommendation for advancement or abandonment made by the first worker matches the action of advancement or abandonment taken by the administrator, and further comprises, for a second one of the workers, determining a wisdom credential for the second worker in accordance with whether a recommendation for advancement or abandonment made by the second worker matches the action of advancement or abandonment taken by the administrator.

65. The method of claim 60 wherein:
the collaboration comprises evaluations by some of the workers of others of the workers, distribution of merit points to at least some of the workers, and recommendations of abandonment or advancement of the idea by at least some of the workers and an action of advancement or abandonment taken by an administrator;

the determining step comprises, for a first one of the workers: determining a link credential for the first worker in accordance with evaluations of the first worker by at least some of the other workers;

determining a merit credential for the first worker in accordance with a first assignment of merit points by an administrator;

determining a wisdom credential for the first worker in accordance with whether a recommendation for advancement or abandonment made by the first worker matches the action of advancement or abandonment taken by the administrator;

the determining step further comprises, for a second one of the workers, determining a link credential for the second worker in accordance with evaluations of the second worker by at least some of the other workers;

determining a merit credential for the second worker in accordance with a second assignment of merit points by the administrator; and determining a wisdom credential for the second worker in accordance with whether a recommendation for advancement or abandonment made by the second worker matches the action of advancement or abandonment taken by the administrator.

66. A computer network based method for a worker to collaborate with a plurality of other workers, comprising:

receiving a worker credential comprising an influence credential calculated using a weighted links credential, a weighted merit credential, and weighted wisdom credential;

evaluating an idea posted on a worksite on the computer network;

furnishing results of the idea evaluating step to a work module on the computer network, the results of the idea evaluating step being weighed in accordance with the worker credential;

evaluating comments of other workers on the idea, the comments of the other workers being posted on the worksite;

furnishing results of the comments evaluating step to the work module, the results of the comments evaluating step being weighed in accordance with the worker credential;

posting further comments on the idea to the worksite;

receiving an adjustment to the worker credential in accordance with evaluations by the other workers of the posted further comments; and determining an outcome of the idea using the influence credential.

67. The method of claim 66 further comprising posting another idea to the worksite, wherein the worker credential is farther adjusted in accordance with evaluations by the other workers of the posted another idea.

68. The method of claim 66 wherein the worker credential comprises merit, link wisdom, or influence.

69. The method of claim 66 further comprising receiving an adjustment to the worker credential in accordance with actions by an administrator of the worksite.

70. The method of claim 69 further comprising merit points by an administrator.

71. The method of claim 69 further comprising action by an administrator including abandonment or advancement of an idea and the posted further comments include a recommendation of abandonment or advancement, the influence credential being adjusted based on whether the recommendation matches the action by the administrator.

* * * * *